United States Patent
Rivera

(10) Patent No.: US 12,117,922 B1
(45) Date of Patent: Oct. 15, 2024

(54) COMPUTING TECHNOLOGIES FOR TRACING SOURCE CODE TO DETERMINE COMPLIANCE OR LACK THEREOF WITH OPERATIONAL REQUIREMENTS THEREFOR

(71) Applicant: EAGLE6 Software, Inc., Jeffersonville, IN (US)

(72) Inventor: Joey Rivera, Jeffersonville, IN (US)

(73) Assignee: EAGLE6 Software, Inc., Jeffersonville, IN (US)

( * ) Notice: Subject to any disclaimer, the term of this patent is extended or adjusted under 35 U.S.C. 154(b) by 127 days.

(21) Appl. No.: 18/093,698

(22) Filed: Jan. 5, 2023

Related U.S. Application Data

(60) Provisional application No. 63/297,385, filed on Jan. 7, 2022.

(51) Int. Cl.
G06F 11/36 (2006.01)

(52) U.S. Cl.
CPC ...... *G06F 11/3636* (2013.01); *G06F 11/3616* (2013.01)

(58) Field of Classification Search
USPC .................................................. 717/124–135
See application file for complete search history.

(56) References Cited

U.S. PATENT DOCUMENTS

| | | | |
|---|---|---|---|
| 6,230,313 B1 | 5/2001 | Callahan, II | |
| 6,593,940 B1 | 7/2003 | Petersen | |
| 7,000,119 B1 | 2/2006 | Jia | |
| 8,438,452 B2 | 5/2013 | Agarwal | |
| 8,453,106 B2 | 5/2013 | DeLine | |
| 8,522,217 B2 | 8/2013 | Dutta | |
| 8,806,461 B2 | 8/2014 | Aronson | |
| 9,021,592 B2 | 4/2015 | Heitzman | |
| 9,681,271 B2 | 6/2017 | Joe | |

(Continued)

FOREIGN PATENT DOCUMENTS

| | | |
|---|---|---|
| JP | 2016181228 A | 10/2016 |
| KR | 101767481 B1 | 8/2017 |

OTHER PUBLICATIONS

Network Simulation Tools, How to generate graph from trace file in NS2, downloaded from internet Oct. 27, 2021, https://networksimulationtools.com/how-to-generate-graph-from-trace-file-in-ns2/ (5 pages).

*Primary Examiner* — Qing Chen
(74) *Attorney, Agent, or Firm* — Dentons US LLP

(57) ABSTRACT

Tracing source code to determine compliance or lack thereof with operational requirements therefor. For example, a computing instance may access a source code of a codebase for a software system, application, or component and run a trace through the source code from a starting point in the source code through all possible routes in the source code until the trace has reached an end point in the source code. The computing instance may identify a first subset of routes from the all possible routes that is not compliant with a set of operational requirements for the source code or a second subset of routes from the all possible routes that is compliant with the set of operational requirements. As such, once the first subset of routes or the second subset of routes is output, a user may perceive the first subset of routes or the second subset of routes.

23 Claims, 46 Drawing Sheets

(56) References Cited

U.S. PATENT DOCUMENTS

| | | |
|---|---|---|
| 10,255,045 B2 | 4/2019 | Drukman |
| 2009/0133006 A1* | 5/2009 | Cheung ..................... G06F 8/71 |
| | | 717/144 |
| 2011/0126288 A1* | 5/2011 | Schloegel ............. G06F 21/577 |
| | | 717/106 |
| 2012/0066662 A1* | 3/2012 | Chao ...................... G06Q 10/06 |
| | | 717/104 |
| 2015/0234730 A1 | 8/2015 | Puthuff |
| 2015/0347094 A1 | 12/2015 | Lattner |
| 2022/0198024 A1* | 6/2022 | Hendrickx ................ G06F 8/70 |
| 2023/0048589 A1* | 2/2023 | Shannon ................ G06F 21/53 |

\* cited by examiner

Block 201 - Assertion of Software Specification
A set of formal requirements (measurable) that identify specific details for how a software system shall behave during runtime.

Example A1: "The system shall display a welcome message by utilizing the welcome.htm page that calls the HW.Service and the WM.DB, exclusively."

Block 203 - Assertion Trace Sets
Utilizing the temporal model of the all possible software traces (202), identify all software traces that satisfy the assertion of the software specification (201)

There are two possible traces:
T1: {A, B, C, D, E}
T2: {A, F, C, D, E}

Assertion 1 (A1) is formalized by a user selecting the nodes in the temporal model that satisfy the formal assertion:
A1: {T1}

204 - Assertion Violations

Identify all remaining software traces other than the all software traces that satisfy the assertion of the software specification (201), i.e., all remaining software traces other than the all acceptable traces that satisfy A1

There are two possible traces:
T1: {A, B, C, D, E}
T2: {A, F, C, D, E}

Assertion A1 violation is identified by querying the temporal model for all traces that are not acceptable A1 traces as identified within the formal specification of A1: {T1}. Assertion Violation: A1: T2

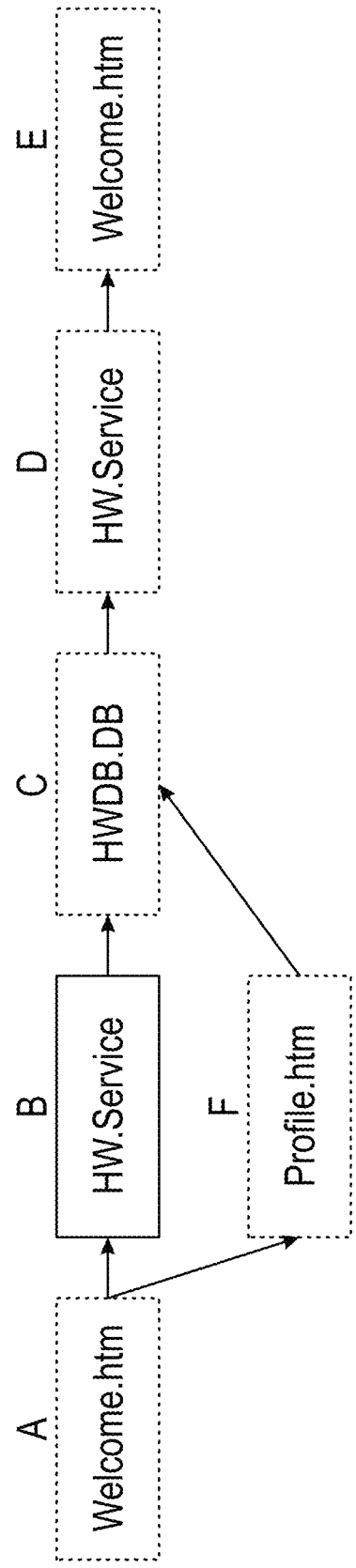

Identify software traces that are not in software design specification.

FIG. 6

Consider the case where there is a code base and requirements. The goal is to connect these assets together so we may determine that traces through the code are expected.

First, source code in ingested into Eagle6 using the normal method. This generates an abstract version of the source code that can be manipulated and processed.

Second, requirements are specified using the Eagle6 Requirements Editor. A new Requirement is added and then fleshed out. The Requirements Editor gives the user the ability to break complicated requirements into small, more understandable requirements to any necessary level of fidelity.

Now the requirements are source code abstraction are inspected and the valid traces identified using the tracing tool.

The valid traces are associated to the relevant requirements using the Requirements Editor. Eagle6 will now watch the system looking for anomalies. Anomalies are detected in many cases, including but not limited to:

1. Source code being changed such that the association between the previously identifies traces could be compromised,
2. Any change of requirements that could affect the defined traces,
3. Dependencies associated with either source code or requirements being added, modified, or removed.

Whenever Eagle6 detects a possible issue any such situations occur, Eagle6 will issue a notification to affected users allowing them to act before the situation escalates.

FIG. 14

Populate the required fields and select CREATE REQUIREMENT

FIG. 16

As the user searches for the asset/entity, the box will populate. They will select and click OK. This links that asset/entity to that step in the requirement.

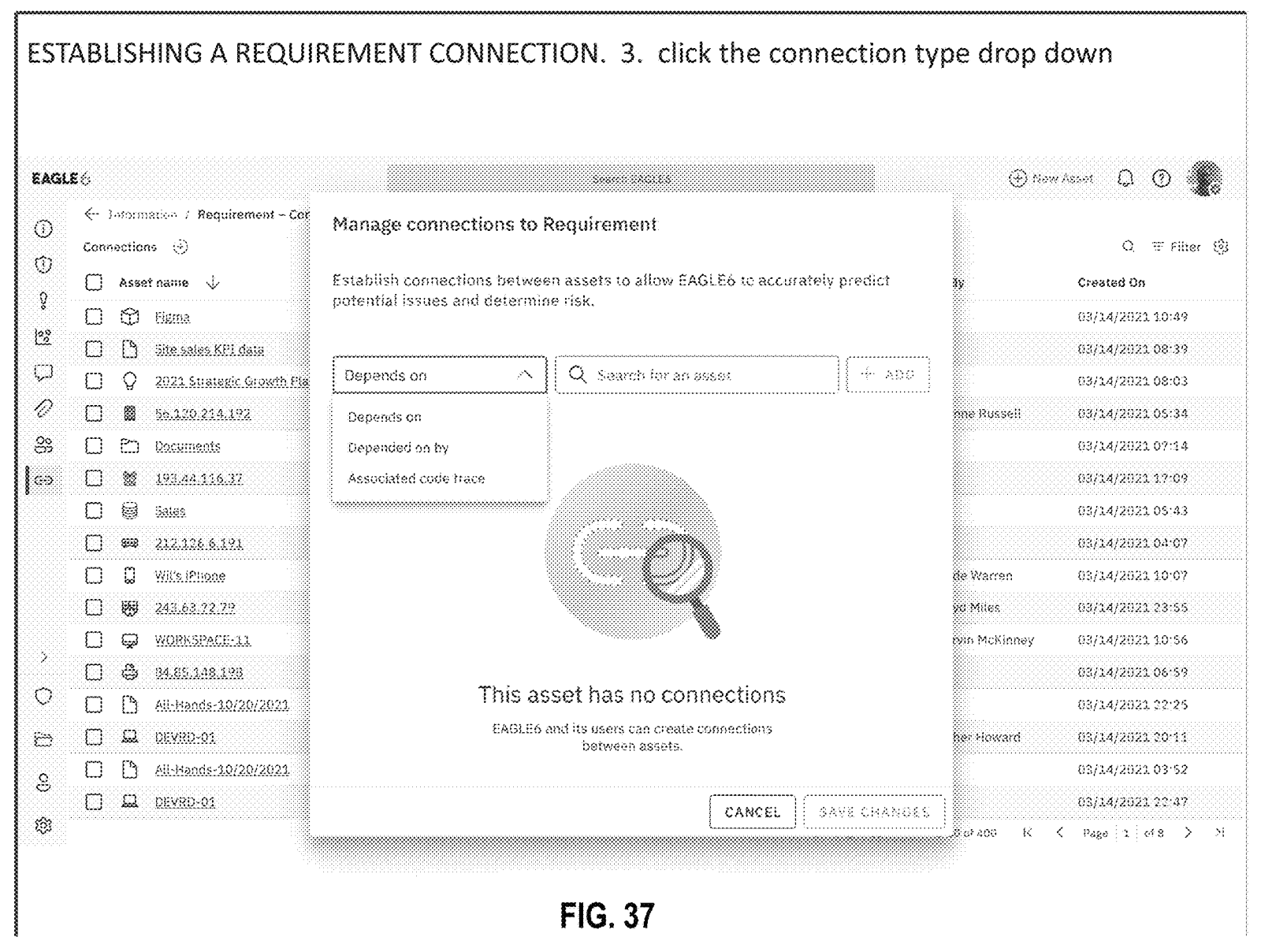

ESTABLISHING A REQUIREMENT CONNECTION. 3. click the connection type drop down

FIG. 37

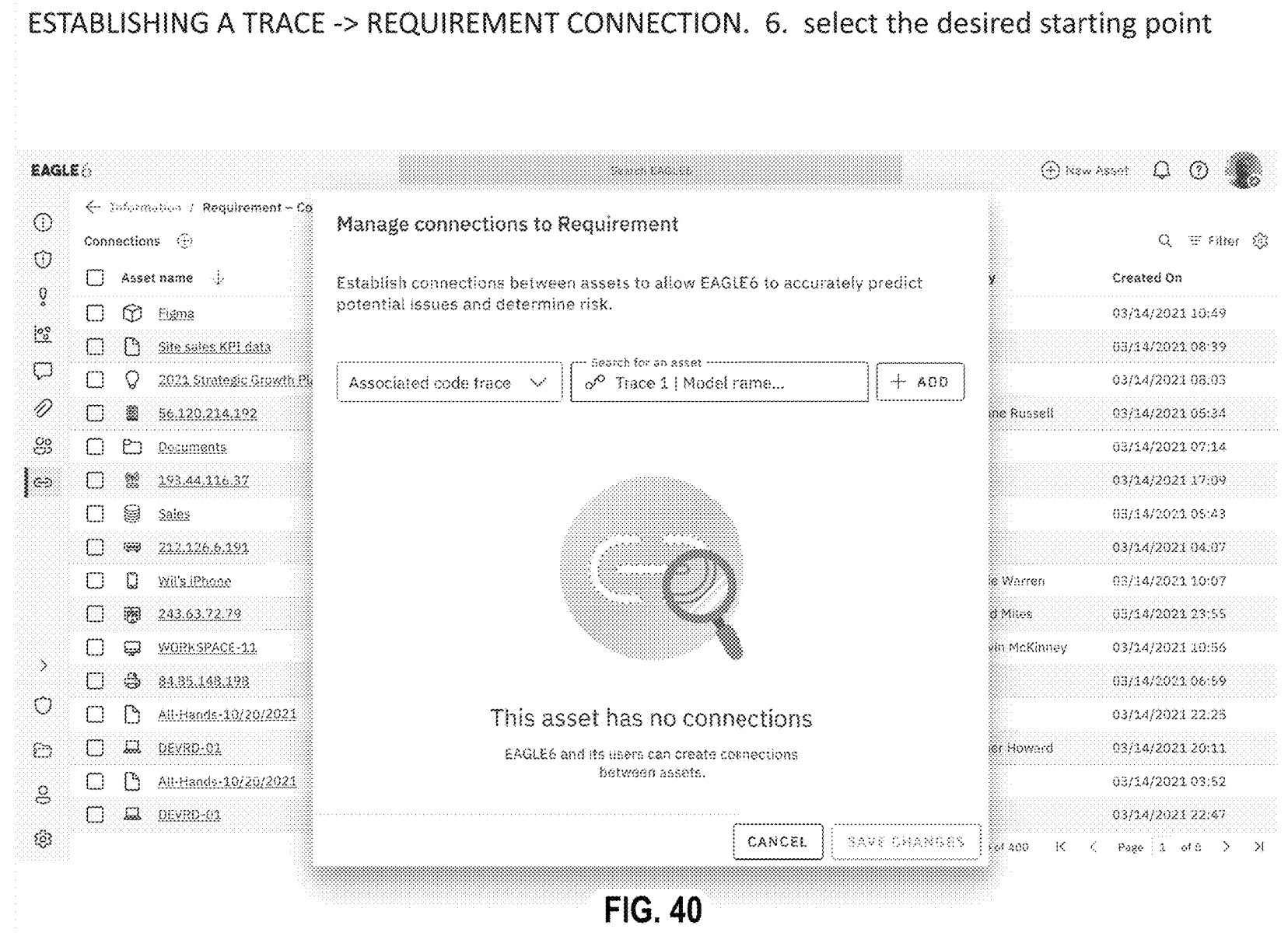

ESTABLISHING A TRACE -> REQUIREMENT CONNECTION. 6. select the desired starting point

FIG. 40

```
O^DIK.m
44  . S ^UTILITY("DIK",DIKJ,"KW",+%)=DH U'DV U DW
45  . D CHK($G(DU(+%)),.DU,.DIKCHK)
46  E  D
47  . S ^UTILITY("BIK",DIKJ,DH,DV,DW)=^DD(DH,DV,1,DW,X)
48  . D CHK(DH,.DU,.DIKCHK)
49  Q
50 CHK(F,DU,DIKCHK) ;Set DIKCHK(f) for file F and its parents
51 Q:$D(DIK0)!'$G(DIKCHK)
52 F  Q:'F  Q:$D(DIKCHK(F))  S DIKCHK(F)=1,F=$G(DU(F))
53 Q
54 ;
55 A1 F DV=0:0 S DV=$O(^DD(DH,"AUDIT",DV)) Q:DV'>0  D A1 ;FIND AUDITED FIELDS
56 Q
57 A1 D 0 S ^UTILITY("DIK",DIKJ,DH,DV,99)="S DIIX="_(4-X)_" D:$G(DIK(0))!["A"" AUDIT" D CHK(DH,.DU,.DIKCHK) Q
58 ;
59 ;REMEMBER HOW TO GRAB THE FIELD'S VALUE
60 S DW=$P(^DD(DH,DV,0),U,4),^UTILITY("DIK",DIKJ,DH,DV)=$P(DW,"",",1),DW=$P(DW,"",2)
61 S ^UTILITY("DIK",DIKJ,DH,DV,0)=$S(DW:"S X=$P($G(^($X)),U,"_DW_")",1:"S X=$E($G(^($X)),"_+$E(DW,2,9)_","_$P(DW,"",2)_")"),DW=0
62 Q
63 ;
64 IX ;One entry, all fields, KILL then SET
65 N DIKJ,DIKS,DIKZ1,DIN,DH,DU,DV,DW,DIKDA,DIKALLR
66 D DIK0,CHKS I $D(DIKZ1) N DIKKS S DIKKS=1 D @DIKGP G Q
67 S X=2,DIKNM=1 D BD,1^DIK1
68 IX1 ;One entry, all fields, SET (X=1)
69 N DIKJ,DIKS,DIKZ1,DIN,DH,DU,DV,DW,DIKDA,DIKSET,DIKALLR
70 D DIK0 I '$D(DIKNM) D CHKS I $D(DIKZ1) N DIKST S DIKST=1 D @DIKGP G Q
71 S X=1,DIKSET=1 D BD,1^DIK1
72 ;
73 D INDEX^DIKC(DIK,.DA,"",$E("K",$D(DIFROM)#2+1)_$E("S",$G(DIK(0))["S"])
74 G Q
75
```

FIG. 46

COMPUTING TECHNOLOGIES FOR TRACING SOURCE CODE TO DETERMINE COMPLIANCE OR LACK THEREOF WITH OPERATIONAL REQUIREMENTS THEREFOR

CROSS-REFERENCE TO RELATED PATENT APPLICATION

This patent application claims a benefit of priority to U.S. Provisional Patent Application No. 63/297,385 filed 7 Jan. 2022, which is incorporated by reference herein for all purposes.

TECHNICAL FIELD

Generally, this disclosure relates to formal methods. More specifically, this disclosure relates to tracing source code to determine compliance or lack thereof with operational requirements therefor.

BACKGROUND

A source code includes a collection of code, with or without comments, written using a human-readable programming language (e.g., Java, Perl), usually in a plain text format. The source code enables a software developer to specify, usually in the plain text format, various actions (e.g., read, write, call, instantiate) to be performed by a computer after being transformed by an assembler or compiler into a binary machine code that can be executed by the computer. The binary machine code may then be stored for execution at a later point in time or the source code may be interpreted and thus immediately executed. To maintain the source code (e.g., for debugging, auditing, updating), the software developer may perform a trace to follow an execution of a program or source code segment to monitor various logical components (e.g., files, functions, objects, variables) for changes or lack thereof during the execution of the program or source code segment or to determine what the program or source code segment outputs or calls during the execution of the program or source code segment.

The source code may be stored in a codebase dedicated to building a software system, application, or component. The codebase, whether monolithic or distributed, may be stored in a source control repository, whether public or private, in a version control system to assist in resolving conflicts that may arise when multiple software developers submit overlapping modifications to the source code in the codebase. As such, there may often be a need to know about potential changes to the source code in the codebase and potential risks (e.g., bugs, exploits) that may be associated with such changes. For example, since these changes may include adding, removing, or modifying the source code in the codebase, these changes can have an upstream or downstream impact to the software system, application, or component being developed, which may in-turn adversely propagate or cascade to dependent systems, systems of systems, enterprises, end users, business processes, and missions (e.g., cross-cutting concerns). However, given various modern employment trends among software developers, there is a low probability that a given software developer (1) was present when the codebase was created (e.g., first line of source code was written) and (2) has a complete working knowledge of all possible starting and ending points in the codebase which would result in a complete trace through the source code in the codebase. Therefore, not all possible traces within the source code of the codebase may be known to or desired by the given software developer. As such, the source code in the codebase may contain traces that are unknown or unwanted by the given software developer due to potential security risks, intermittent failures, or data loss, especially when multiple software developers may submit overlapping modifications to the source code in the codebase.

As the source code in the codebase ages, especially as the codebase grows in size or functionality, there may be other problems that software development teams may encounter. For example, some legacy languages (e.g., COBOL, Fortran), needing modernization, that are still supporting key missions and enterprises are abundant. As such, given various modern employment trends among software developers, there may be a shortage in labor force skilled to support these legacy languages, especially since these legacy languages are not commonly being taught and are being replaced with modern, more widely adopted languages (e.g., C#, Python).

The source code in the codebase may also have various documentation issues and access and correlation of such documentation to the source code in the codebase could be non-existent, stale, or ambiguous. For example, when working with a legacy software system or complex software system new to any software developer, not having proper documentation or foresight into all possible traces in the source code of the codebase may cause that respective software developer to inadvertently make a change in the source code of the codebase that modifies, removes, disables, or adds a functionality, which may be undesired or unknown. Likewise, some key functionality may be inadvertently overlooked, duplicated, deprecated, removed, or disabled.

SUMMARY

This disclosure enables various computing technologies for tracing source code to determine compliance or lack thereof with operational requirements therefor. For example, these technologies may enable a computing instance (e.g., a physical machine, a virtual machine) to access (e.g., read) a source code of a codebase for a software system, application, or component. Then, the computing instance may run a trace (e.g., track an execution path) through the source code from a starting point (e.g., user-selected) in the source code through all possible routes in the source code until the trace has reached an end point in the source code. Then, based on the trace, the computing instance may identify a first subset of routes from the all possible routes that is not compliant with a set of operational requirements (e.g., represented as a diagram, a graph) for the source code or a second subset of routes from the all possible routes that is compliant with the set of operational requirements. For example, the computing instance may identify the second subset of routes that is compliant with the set of operational requirements and then classify all remaining routes from the all possible routes as the first subset of routes that is not compliant with the set of operational requirements. As such, once the first subset of routes or the second subset of routes is output (e.g., visual, tactile), a user (e.g., a software developer, a software architect, a software auditor) may perceive (e.g., visual, tactile) the first subset of routes or the second subset of routes. If desired, the computing instance may be programmed (e.g., requested, triggered, activated, scheduled) to subsequently re-run the trace so that the first subset of routes or the second subset of routes is re-identified (e.g., updated, revised, renewed, refreshed, maintained) if the source code is changed. This may be technologically advantageous because the user may be informed (e.g., visual, tactile) whether such changes to the source code increase, decrease, or maintain potential risks (e.g., bugs, exploits) that may be associated with such changes relative to the first subset of routes or the second subset of routes. Such knowledge may enable the user to reduce security risks, intermittent failures, or data loss. For example, the user may revert or modify (e.g., via a physical or virtual keyboard, a tactile interface) some or all of these changes to the source code if the user identifies the potential risks associated with such changes are maintained or increased. These technological advantages may be further enhanced even if the source code is written in legacy languages (e.g., COBOL, Fortran) or the source code has various documentation issues (e.g., documentation that is non-existent, stale, or ambiguous).

DESCRIPTION OF DRAWINGS

FIG. 6 shows diagram of an embodiment of a block for an assertion violation of FIG. 2 according to this disclosure.

FIG. 8 to FIG. 42 show various screenshots with various explanation for a system enabled for tracing source code to determine compliance or lack thereof with operational requirements therefor according to this disclosure.

FIG. 46 shows a screenshot of an embodiment of an editing window of a source editor accessed when a route from the subset of routes of FIG. 45 has been selected according to this disclosure.

DETAILED DESCRIPTION

Figure 1:
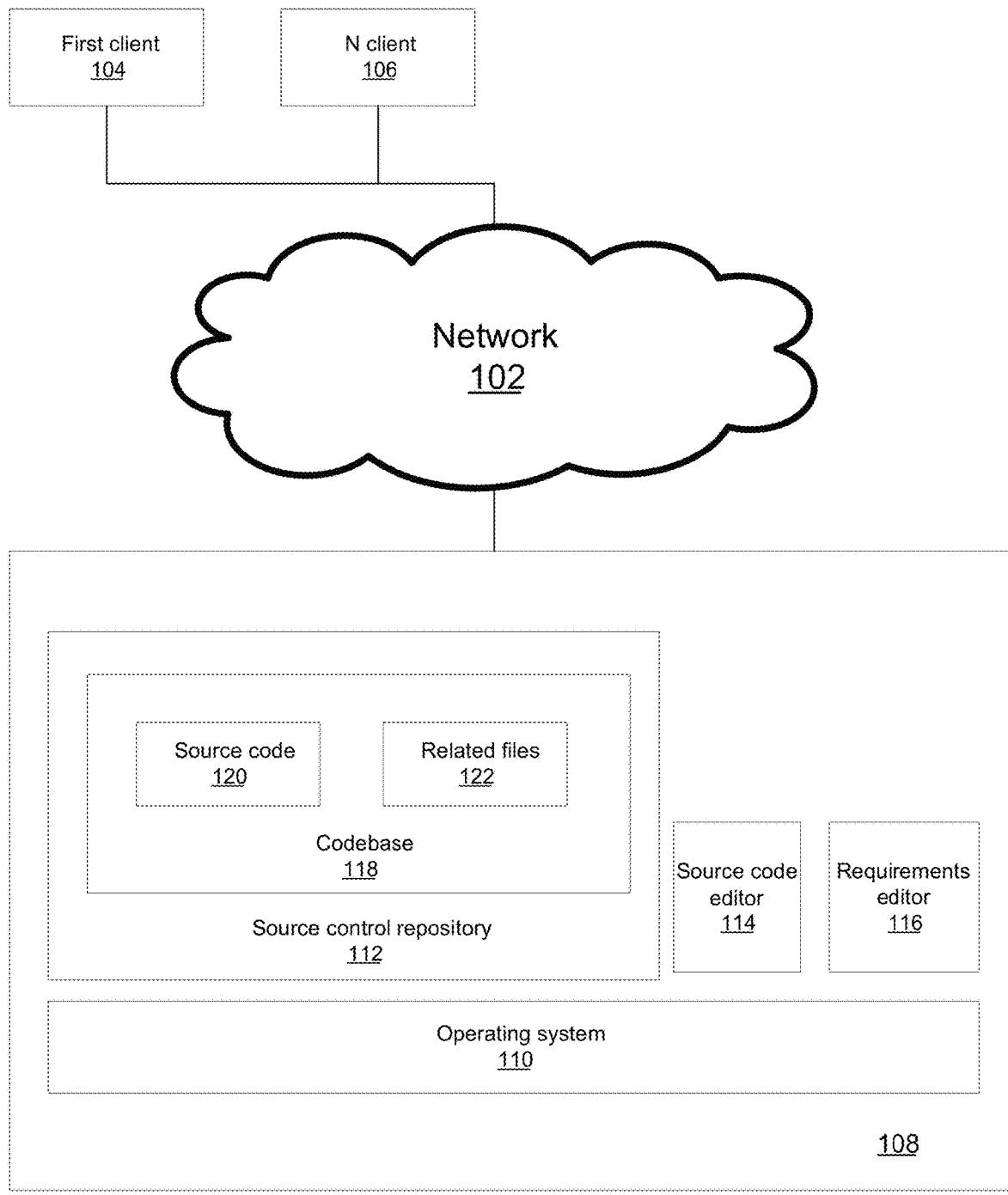
FIG. 1 shows a diagram of an embodiment of an architecture of a system enabled for tracing source code to determine compliance or lack thereof with operational requirements therefor according to this disclosure.

This disclosure enables various computing technologies for tracing source code to determine compliance or lack thereof with operational requirements therefor. For example, these technologies may enable a computing instance (e.g., a physical machine, a virtual machine) to access (e.g., read) a source code of a codebase for a software system, application, or component. Then, the computing instance may run a trace (e.g., track an execution path) through the source code from a starting point (e.g., user-selected) in the source code through all possible routes in the source code until the trace has reached an end point in the source code. Then, based on the trace, the computing instance may identify a first subset of routes from the all possible routes that is not compliant with a set of operational requirements (e.g., represented as a diagram, a graph) for the source code or a second subset of routes from the all possible routes that is compliant with the set of operational requirements. For example, the computing instance may identify the second subset of routes that is compliant with the set of operational requirements and then classify all remaining routes from the all possible routes as the first subset of routes that is not compliant with the set of operational requirements. As such, once the first subset of routes or the second subset of routes is output (e.g., visual, tactile), a user (e.g., a software developer, a software architect, a software auditor) may perceive (e.g., visual, tactile) the first subset of routes or the second subset of routes. If desired, the computing instance may be programmed (e.g., requested, triggered, activated, scheduled) to subsequently re-run the trace so that the first subset of routes or the second subset of routes is re-identified (e.g., updated, revised, renewed, refreshed, maintained) if the source code is changed. This may be technologically advantageous because the user may be informed (e.g., visual, tactile) whether such changes to the source code increase, decrease, or maintain potential risks (e.g., bugs, exploits) that may be associated with such changes relative to the first subset of routes or the second subset of routes. Such knowledge may enable the user to reduce security risks, intermittent failures, or data loss. For example, the user may revert or modify (e.g., via a physical or virtual keyboard, a tactile interface) some or all of these changes to the source code if the user identifies the potential risks associated with such changes are maintained or increased. These technological advantages may be further enhanced even if the source code is written in legacy languages (e.g., COBOL, Fortran) or the source code has various documentation issues (e.g., documentation that is non-existent, stale, or ambiguous).

This disclosure is now described more fully with reference to various figures that are referenced above, in which some embodiments of this disclosure are shown. This disclosure may, however, be embodied in many different forms and should not be construed as necessarily being limited to only embodiments disclosed herein. Rather, these embodiments are provided so that this disclosure is thorough and complete, and fully conveys various concepts of this disclosure to skilled artisans.

Note that various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Similarly, as used herein, various singular forms "a," "an" and "the" are intended to include various plural forms (e.g., two, three, four) as well, unless context clearly indicates otherwise. For example, a term "a" or "an" shall mean "one or more," even though a phrase "one or more" is also used herein.

Moreover, terms "comprises," "includes" or "comprising," "including" when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

Additionally, although terms first, second, and others can be used herein to describe various elements, components, regions, layers, subsets, diagrams, or sections, these elements, components, regions, layers, subsets, diagrams, or sections should not necessarily be limited by such terms. Rather, these terms are used to distinguish one element, component, region, layer, subset, diagram, or section from another element, component, region, layer, subset, diagram, or section. As such, a first element, component, region, layer, subset, diagram, or section discussed below could be termed a second element, component, region, layer, subset, diagram, or section without departing from this disclosure.

Also, unless otherwise defined, all terms (including technical and scientific terms) used herein have the same meaning as commonly understood by one of ordinary skill in an art to which this disclosure belongs. As such, terms, such as those defined in commonly used dictionaries, should be interpreted as having a meaning that is consistent with their meaning in a context of a relevant art and should not be interpreted in an idealized or overly formal sense unless expressly so defined herein.

Hereby, all issued patents, published patent applications, and non-patent publications (including identified articles, web pages, websites, products and manuals thereof) that are mentioned in this disclosure are herein incorporated by reference in their entirety for all purposes, to same extent as if each individual issued patent, published patent application, or non-patent publication were specifically and individually indicated to be incorporated by reference. If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

FIG. 1 shows a diagram of an embodiment of an architecture of a system enabled for tracing source code to determine compliance or lack thereof with operational requirements therefor according to this disclosure. In particular, an architecture 100 includes a network 102, a first client 104, a N client N 106, and a computing instance 108. The N client 106 is symbolic and represents any number of clients additional to the first client 104, as needed. The computing instance 112 hosts an operating system (OS) 110, a source control repository 112, a source code editor 114, a requirements editor 116, a codebase 118, a source code 120, and a set of related files 122. The source control repository hosts the codebase 118, the source code 120, and the set of related files 122. The codebase 118 hosts the source code 120 and the set of related files 122.

The network 102 includes a plurality of computing nodes interconnected via a plurality of communication channels, which allow for sharing of resources, applications, services, files, streams, records, information, or others. The network 102 can operate via a network protocol, such as an Ethernet protocol, a Transmission Control Protocol (TCP)/Internet Protocol (IP), or others. The network 102 can have any scale, such as a personal area network (PAN), a local area network (LAN), a home area network, a storage area network (SAN), a campus area network, a backbone network, a metropolitan area network, a wide area network (WAN), an enterprise private network, a virtual private network (VPN), a virtual network, a satellite network, a computer cloud network, an internetwork, a cellular network, or others. The network 102 can include an intranet, an extranet, or others. The network 102 can include Internet. The network 102 can include other networks or allow for communication with other networks, whether sub-networks or distinct networks.

Each of the first client 104 and the N client 106 is in communication with the computing instance 108 through the network 102, whether in a wired, wireless, or waveguide manner. Each of the first client 104 and the N client 106 may be embodied in hardware or software. For example, such hardware embodiments may include various computing form factors, such as a desktop, a laptop, a workstation, a tablet, a smartphone, or other suitable computing form factors. Likewise, such software embodiments may include various software form factors, such as an application, a source code editor, an add-on for an application, an add-on for a source code editor, a browser, a browser extension, a mobile app, a module, or other suitable software form factors. The first client 104 and the N client 106 may be embodied identically or differently from each other in any permutational manner. For example, the first client 104 may be a source code editor running on a workstation and the N client 106 may be a browser running on a desktop, although these form factors can vary, as needed. If properly configured, then the first client 104 and the N client 106 can communicate with each other through the network 102.

The computing instance 108 includes a cloud computing environment defined via a virtual machine, a set of virtual machines, a server, or a set of servers, whether hardware or virtual, where the set of servers operates in concert, such as via a cluster of servers, a grid of servers, or a group of servers, to perform a computing task, such as reading data, writing data, deleting data, collecting data, sorting data, or other date operations. For example, any of such servers can be a web server, an application server, a database server, or other server form factors. The set of servers can be housed in a data center, a server farm, or other suitable housing form factors. The computing instance 108 can provide a plurality of computing services on-demand, such as an infrastructure as a service (IaaS), a platform as a service (PaaS), a packaged software as a service (SaaS), or others. For example, the computing instance 108 can provide computing services from a set of data centers spread across a plurality of availability zones (AZs) in various global regions, where an AZ is a location that contains a plurality of data centers, while a region is a collection of AZs in a geographic proximity connected by a low-latency network link. For example, the computing instance 108 can enable a user to launch a plurality of virtual machines and replicate data in different AZs to achieve a highly reliable infrastructure that is resistant to failures of individual servers or an entire data center. For example, the computing instance 108 can include Amazon Web Services (AWS), Microsoft Azure, Google Cloud, IBM cloud, or others. However, note that the computing instance 108 is not limited to the cloud computing environment. For example, the computing instance 108 can include a physical machine, a virtual machine, a processor, a single core processor, a multi-core processor, a system-on-chip (SOC), or other suitable computing form factors. For example, the computing instance 108 may include a desktop, a laptop, a tablet, a smartphone, a workstation, a terminal, or other suitable computing form factors.

The OS 110 includes system software that manages computer hardware, software resources, and provides common services for computer programs by running on the computing instance 108. For example, the OS 110 can include Microsoft Windows, Apple MacOS, Apple iOS, Linux, or others. For example, the first client 104 or the N client 106 can communicate with the computing instance 108 over the network 102 to operate the OS 110, as disclosed herein.

The source control repository 112 includes a software application running on the OS 110 and programmed to store the source code 102 and the set of related filed 122, and manage changes to the source code 120 and the set of related files 122. For example, such changes may embody or be tagged with a respective identifier (e.g., a number or letter code) associated with a timestamp and an identifier of a user profile making those changes. For example, the source control repository 112 can include a version control application. For example, the first client 104 or the N client 106 can communicate with the computing instance 108 over the network 102 to operate the source control repository 112, as disclosed herein. For example, the source control repository 112 can include Eagle 6, GitHub, or other suitable source control repositories. For example, various screenshots/functionality of the source control repository 112 is shown in FIGS. 8-46. Although the source control repository 112 is depicted as a separate and distinct software application (or another form of suitable software logic) from each of the source editor 114 and the requirements editor 116, this is not mandatory. For example, the source control repository 112 may include the source editor 114 or the requirements editor 116, which may be accessible from within the source control repository 112 or the source control repository 112 may be accessible from which the source editor 114 or the requirements editor 116. Likewise, the source code editor 114 may include the source control repository 112, which may be accessible from within the source code editor 114 or the source code editor 114 may be accessible from within the source control repository 112. Similarly, the requirements editor 116 may include the source control repository 112, which may be accessible from within the requirements editor 116 or the requirements editor 116 may be accessible from within the source control repository 112.

The source code editor 114 includes a software application (or another form of suitable software logic) running on the OS 110 and programmed to have a text-editor functionality designed for creating or editing the source code 120 (e.g., to enhance, automate, or ease writing or modifying the source code 120) within the codebase 118 within the source control repository 112. The source code 114 may be a standalone application or it may be built into an integrated development environment (IDE) or accessible via a web browser. For example, the source code editor 114 may include features specifically designed to simplify and speed up typing of the source code 120, such as syntax highlighting, indentation, syntax checking, autocomplete, source code compression, brace matching, or other suitable functionalities. For example, the source code editor 114 may provide a convenient way to run or request a run of a compiler, interpreter, debugger, or other program relevant for software development. For example, the source code editor 114 may include a structure editor (e.g., to manipulate the source code 120 structure via an abstract syntax tree). For example, the source code editor 114 can include Visual Studio, Borland, Notepad++, Eagle 6, or other suitable source code editors. For example, the first client 104 or the N client 106 can communicate with the computing instance 108 over the network 102 to operate the source code editor 114, as disclosed herein. For example, various screenshots/functionality of the source code editor 114 is shown in FIGS. 8-46. The source code editor 114 may include the source control repository 112 or the requirements editor 116, any of which may be accessed from within the source code editor 114, or the source control repository 112 may include the source code editor 114 or the requirements editor 116, any of which may be accessed from within the source control repository 112.

The requirements editor 116 includes a software application (or another form of suitable software logic) running on the OS 110 and programmed to have a diagram-editor functionality for creating or editing a diagram (e.g., a block diagram) graphically depicting a set of operational requirements for a software system, application, or component. For example, the set of requirements may be depicted via a set of shapes (e.g., a set of rectangles) and a set of connectors (e.g., a set of arrows) where the set of shapes corresponds to a set of logical components (e.g., subroutines, events) recited in the source code 120 for the software system, application, or component and where the set of connectors among the set of shapes directionally indicates an execution path for the set of logical components (e.g., which logical component calls which logical component). For example, the first client 104 or the N client 106 can communicate with the computing instance 108 over the network 102 to operate the requirements editor 116, as disclosed herein. For example, the requirements editor 116 can include Eagle 6, Requirements Editor, Simulink Requirements, or other suitable source code editors. For example, various screenshots/functionality of the requirements editor 116 is shown in FIGS. 8-46. The requirements editor 116 may include the source control repository 112 or the source code editor 114, any of which may be accessed from within the requirements editor 116, or the source control repository 112 may include the source code editor 114 or the requirements editor 116, any of which may be accessed from within the source control repository 112.

Although the requirements editor 116 is depicted as a separate and distinct software application (or another form of suitable software logic) from the source code editor 114, this is not mandatory. For example, the requirements editor 116 and the source code editor 114 can be included in a single software application (or another form of suitable software logic) with a respective source code editing functionality and a respective requirements editing functionality. Likewise, the requirements editor 116 and the source code editor 114 can be accessible from within each other (e.g., the requirements editor 116 is accessible from the source code editor 114 and vice versa). Similarly, the source control repository 112, the source code editor 114, and the requirements editor 116 can be included in a single software application (or another form of suitable software logic) with a respective source control repository functionality, a respective source code editing functionality, and a respective requirements editing functionality, some or all inter-accessible from within each other.

The codebase 118 is a collection of the source code 120 used to build a software system, application, or software component. The codebase 118 can be monolithic or distributed, whether public or private. The codebase 118 can embodied as a set of files or another suitable data organization. For example, the first client 104 or the N client 106 can communicate with the computing instance 108 over the network 102 to access the codebase 118, as disclosed herein.

The source code 120 includes a collection of code, with or without comments, written using a human-readable programming language (e.g., C++, Ruby), usually in a plain text format. The source code 120 enables a software developer (or another user) operating the first client 104 or the N client 106 to specify, usually in the plain text format, various actions (e.g., read, write, delete, access, call, instantiate) to be performed by a computer (e.g., the first client 104 or the N client 106 or the computing instance 108 or another suitable client or machine) after being transformed by an assembler or compiler into a binary machine code that can be executed by the computer. The binary machine code may then be stored for execution at a later point in time or the source code 120 may be interpreted and thus immediately executed. For example, the first client 104 or the N client 106 can communicate with the computing instance 108 over the network 102 to access the source code 120 via the source code editor 114, as disclosed herein. The source code 120 may enable the software system, application, or component at runtime.

The set of related files 122 includes various configuration files, property files, or other suitable files that may be related or necessary for the source code 120, depending on what programming language is used, what type of software is being built, or other related software development considerations. The set of related files 122 may include source code files generated by tools (generated files) or binary library files (object files), if relevant to the source code 120. For example, the first client 104 or the N client 106 can communicate with the computing instance 108 over the network 102 to access the set of related 122 via the source code editor 114, as disclosed herein. The set of related files 122 may enable the software system, application, or component at runtime. Although the source code 120 is separate and distinct from the set of related files 122, this is not mandatory. For example, the source code 120 may include the set of related files 122 or the set of related files 122 may include the source code 120 or the source code 120.

Figure 2:
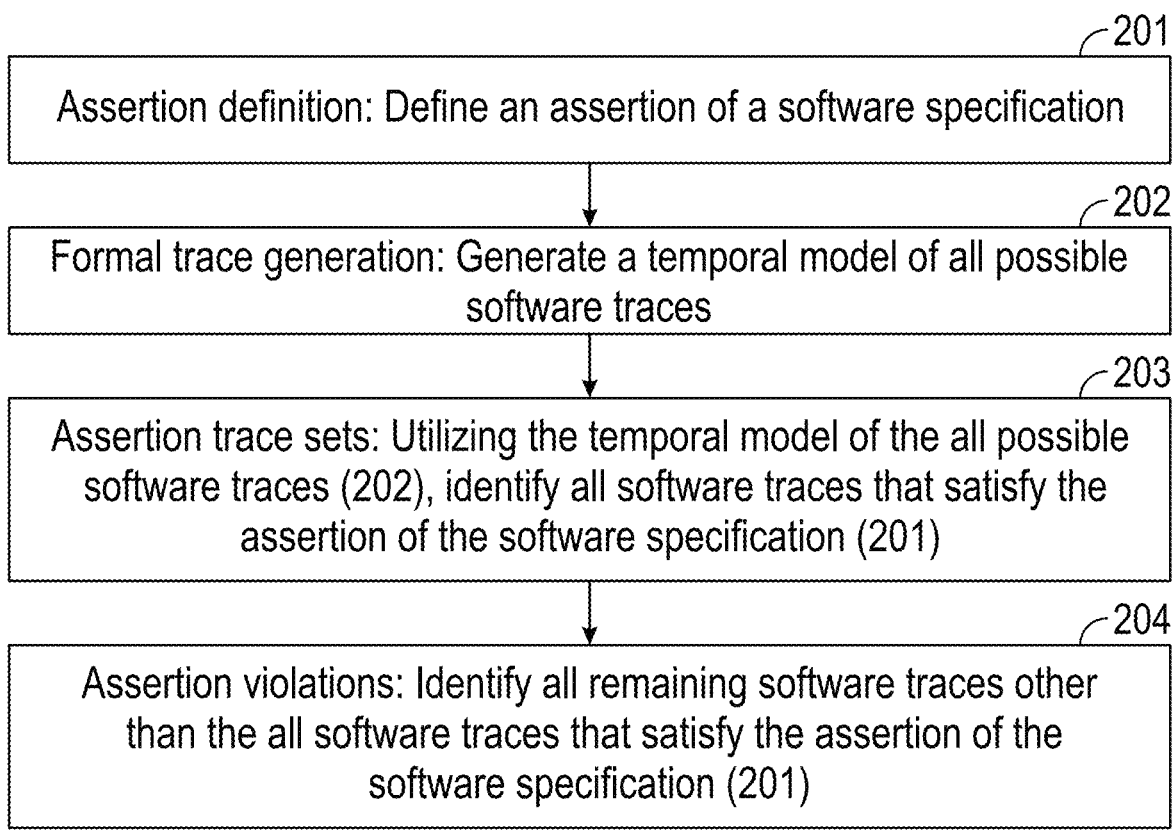
FIG. 2 shows a flowchart of an embodiment of a process for tracing source code to determine compliance or lack thereof with operational requirements therefor according to this disclosure.
Figure 3:
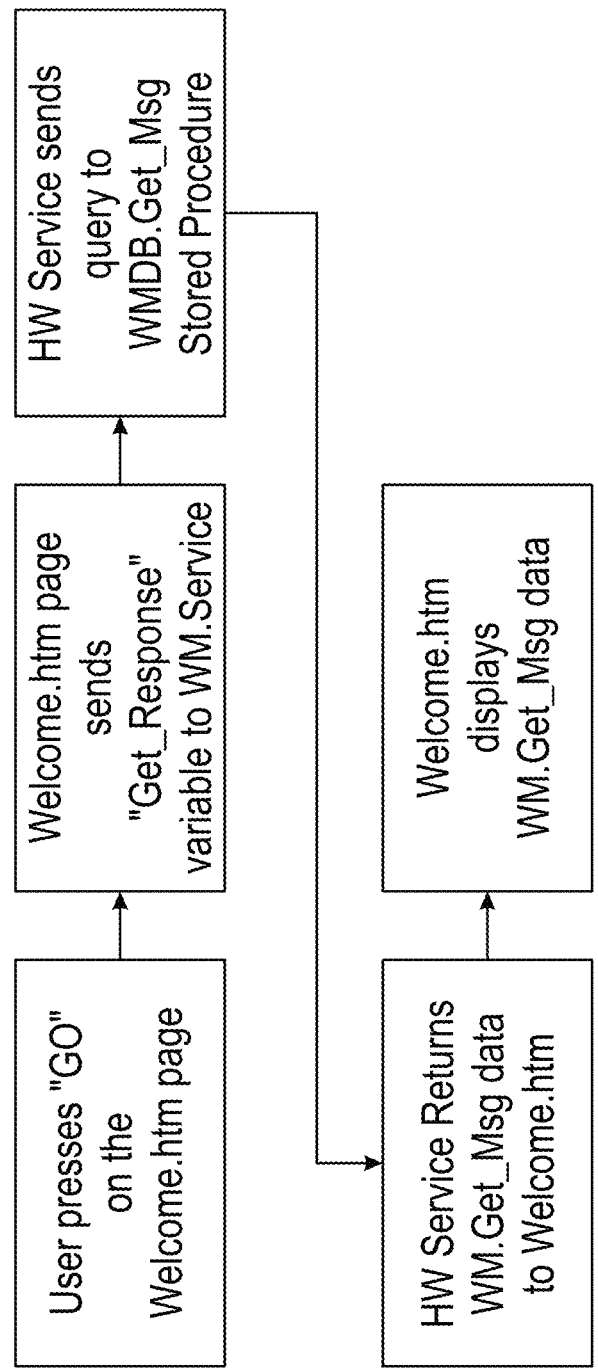
FIG. 3 shows diagram of an embodiment of a block for an assertion definition of FIG. 2 according to this disclosure.
Figure 4:
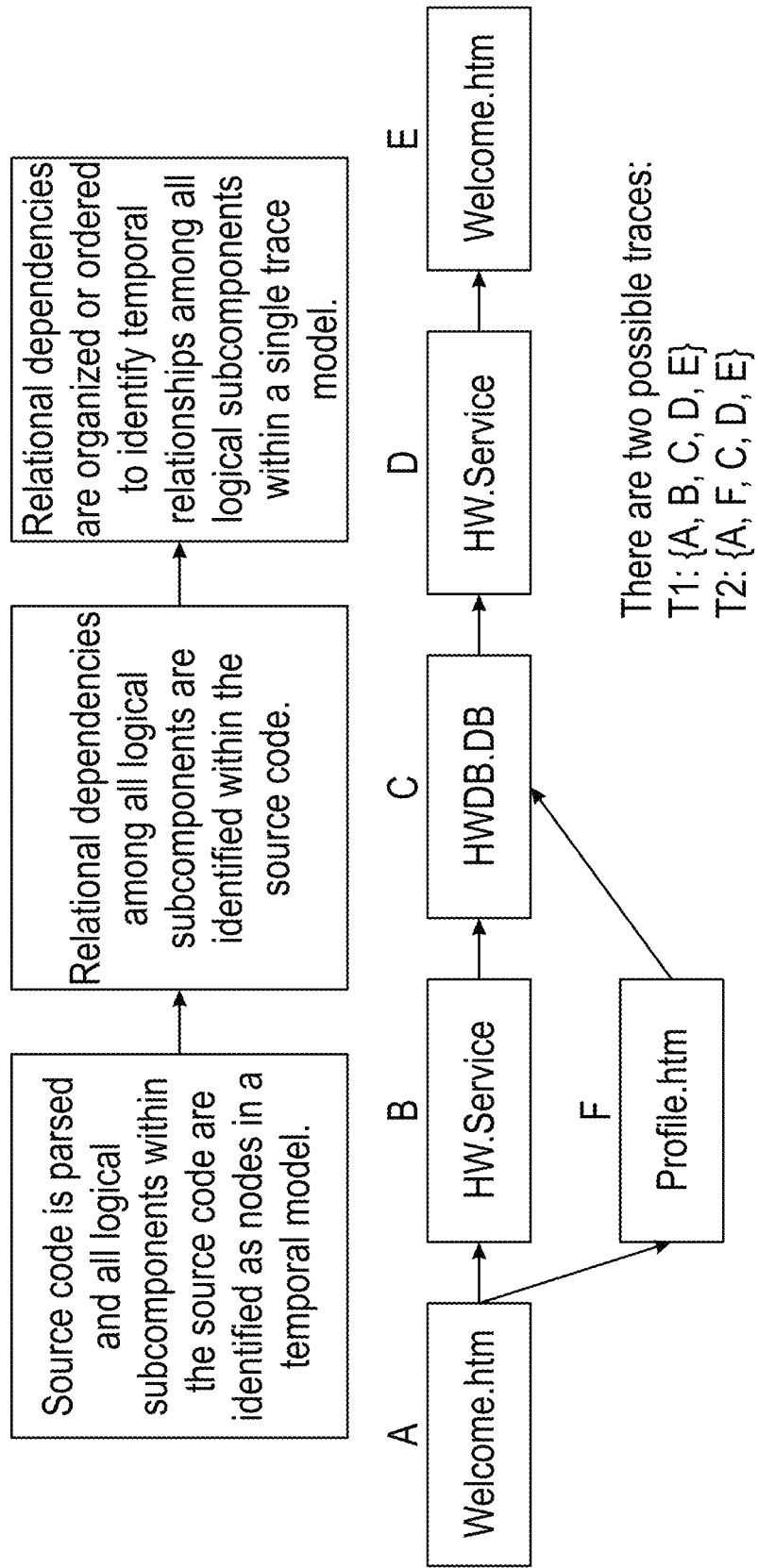
FIG. 4 shows diagram of an embodiment of a block for a formal trace generation of FIG. 2 according to this disclosure.
Figure 5:
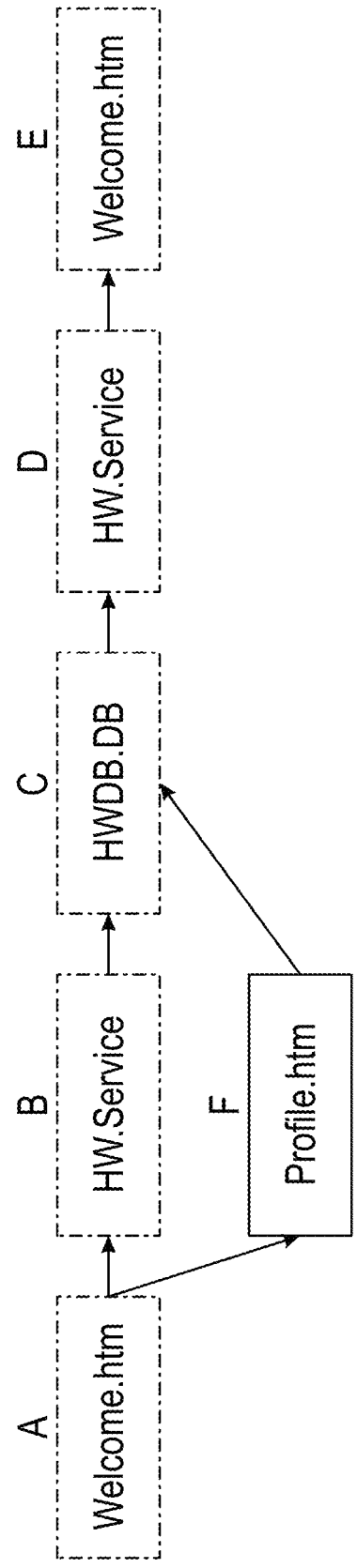
FIG. 5 shows diagram of an embodiment of a block for an assertion trace set of FIG. 2 according to this disclosure.
Figure 43:
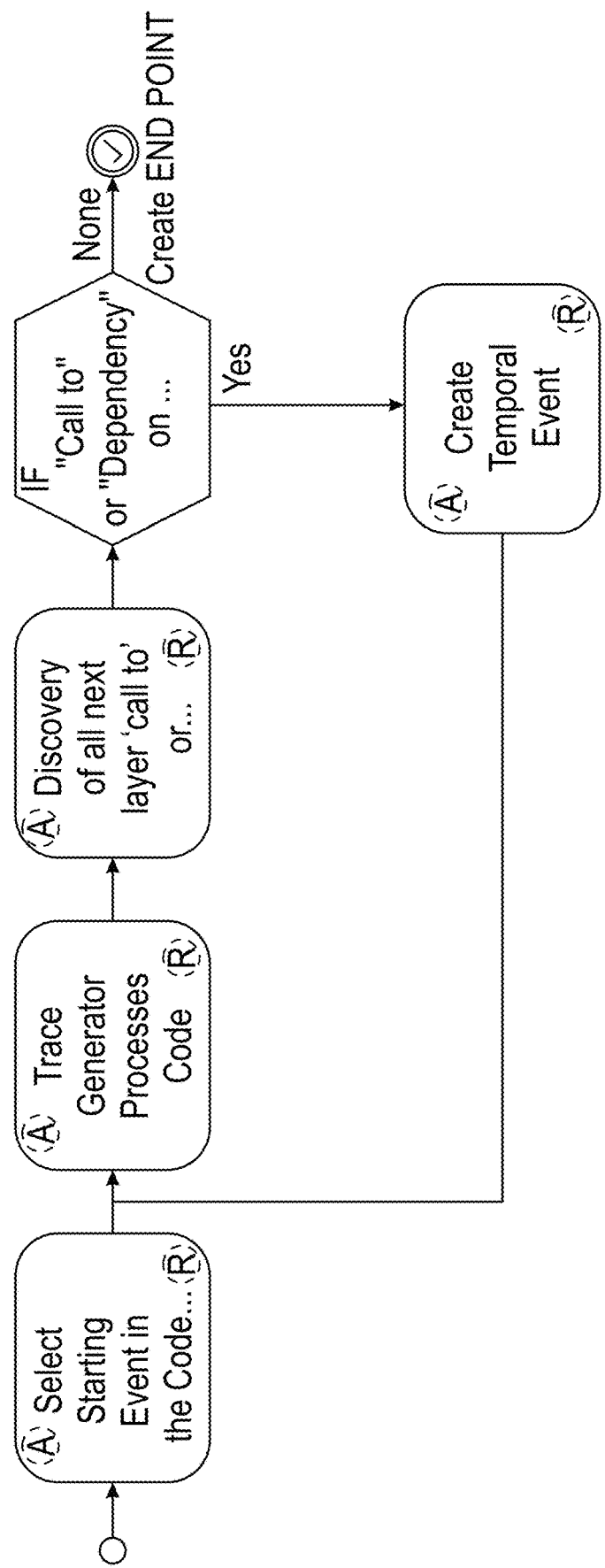
FIG. 43 shows a flowchart of an embodiment for tracing source code according to this disclosure.
Figure 44:
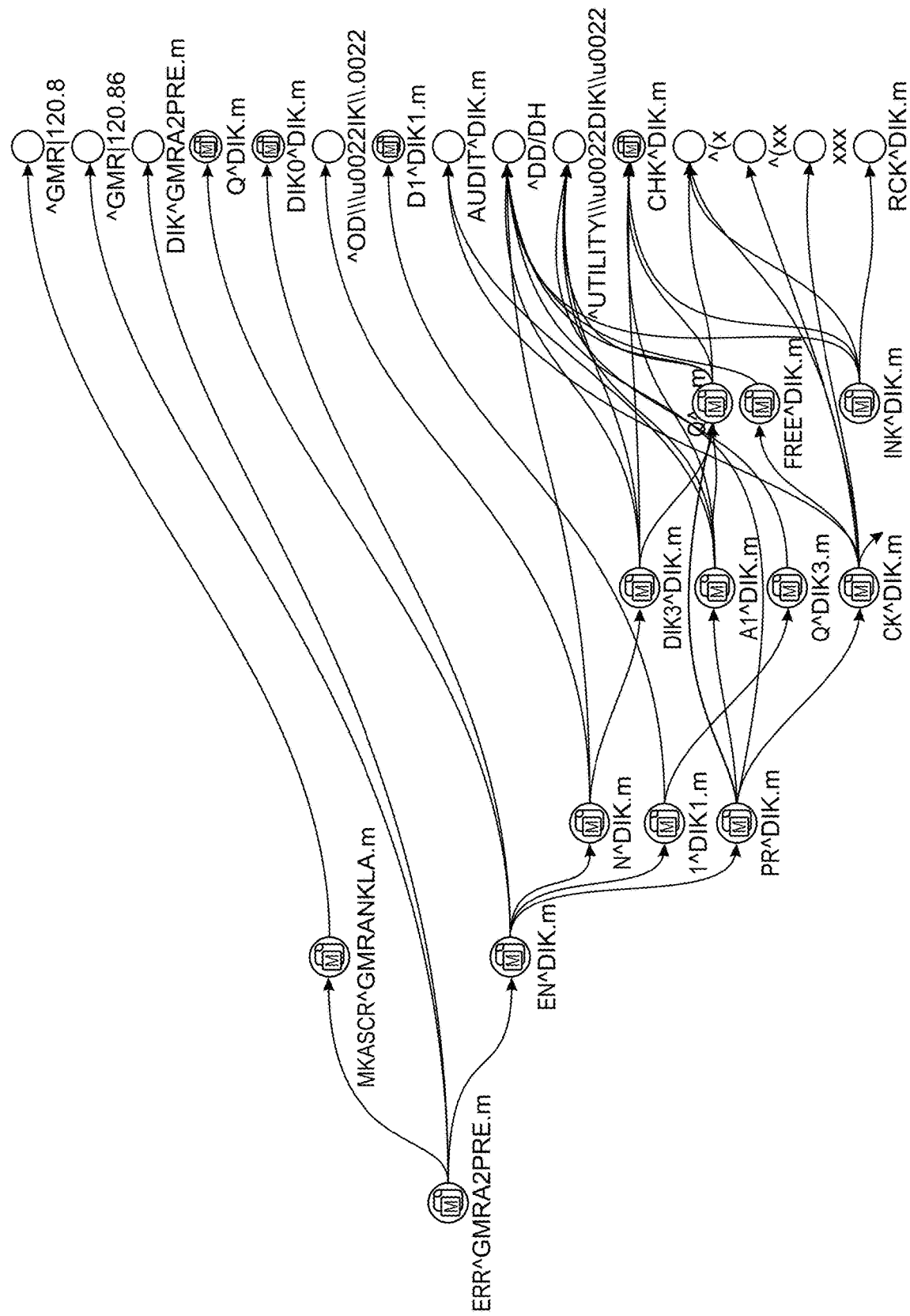
FIG. 44 shows a screenshot of an embodiment of a graph depicting all possible routes in a source code of a codebase according to this disclosure.
Figure 45:
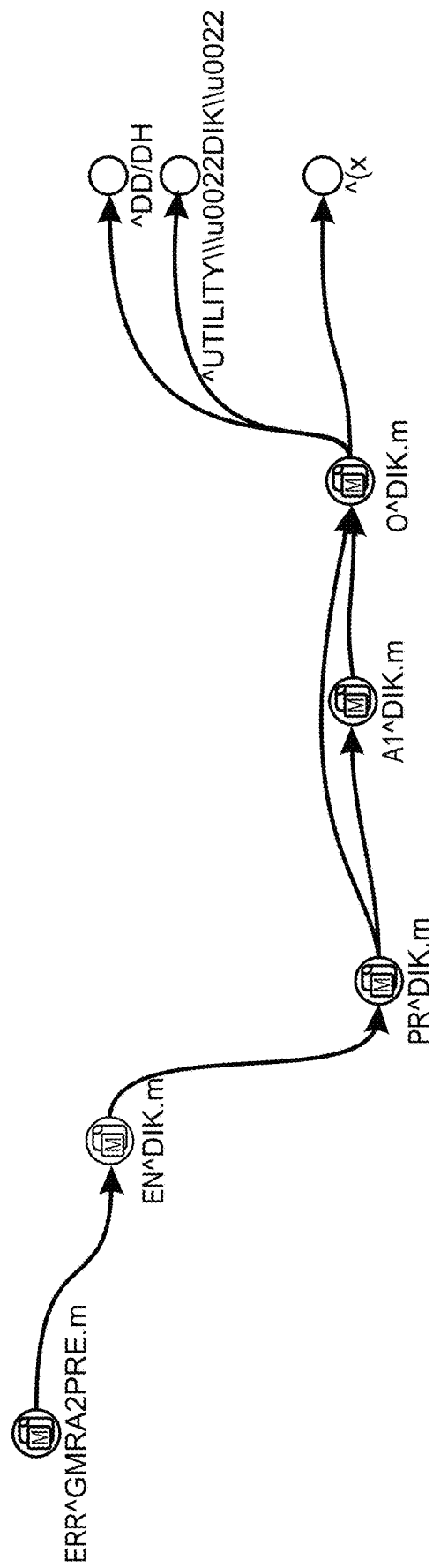
FIG. 45 shows a screenshot of an embodiment of a graph depicting a subset of the all possible routes shown in FIG. 44 according to this disclosure.

FIG. 2 shows a flowchart of an embodiment of a process for tracing source code to determine compliance or lack thereof with operational requirements therefor according to this disclosure. FIG. 3 shows diagram of an embodiment of a block for an assertion definition of FIG. 2 according to this disclosure. FIG. 4 shows diagram of an embodiment of a block for a formal trace generation of FIG. 2 according to this disclosure. FIG. 5 shows diagram of an embodiment of a block for an assertion trace set of FIG. 2 according to this disclosure. FIG. 6 shows diagram of an embodiment of a block for an assertion violation of FIG. 2 according to this disclosure. FIG. 8 to FIG. 42 show various screenshots with various explanation for a system enabled for tracing source code to determine compliance or lack thereof with operational requirements therefor according to this disclosure. FIG. 43 shows a flowchart of an embodiment for tracing source code according to this disclosure. FIG. 44 shows a screenshot of an embodiment of a graph depicting all possible routes in a source code of a codebase according to this disclosure. FIG. 45 shows a screenshot of an embodiment of a graph depicting a subset of the all possible routes shown in FIG. 44 according to this disclosure. FIG. 46 shows a screenshot of an editing window of a source editor accessed when a route from the subset of routes of FIG. 45 has been selected according to this disclosure. In particular, a process 200 includes a set of blocks 201-204, which may be performed by the architecture 100, as explained above.

In block 201, the architecture 100 enables an assertion definition to define an assertion of a software specification, as disclosed herein. The assertion of the software specification can include a set of formal operational requirements, which may be measurable, that identify a set of specific details for how the software system, application, or component shall behave during runtime. The software specification may be for the software system, application, or component. As shown in FIG. 3, there is an assertion A1 for how the software system, application, or component shall behave during runtime, where the assertion A1 has a textual description (e.g., a human-readable sentence) or a diagrammatic description (e.g., a human-readable flowchart in a file or a block diagram in a file), both describing the assertion A1. The assertion of the software specification may be created via the architecture 100. For example, the first client 104 may communicate with the computing instance 108 over the network 102 to operate the requirements editor 116 and form or edit the assertion, as needed, as disclosed herein.

In block 202, the architecture 100 enables a formal trace generation to generate a temporal model of all possible software traces, as disclosed herein. For example, the temporal model may map the all possible software traces in various graphical ways (e.g., a graph, a tree). The formal trace generation may be for the software system, application, or component. The temporal model may be for the software system, application, or component.

The formal trace generation to generate the temporal model of all possible software traces for the software system, application, or component may include various steps. For example, the computing instance 108 may ingest (e.g., access, download, read) the codebase 118 including the source code 120, which may include the set of related files 122. Then, the computing instance 108 may parse (e.g., tokenize) the source code 120, which may include the set of related files 122, to identify a set of logical components (e.g., functions, subroutines, classes, variables, statements, procedures, events, classes) recited therein that enable the software system, application, or component during runtime. Then, the computing instance 108 may perform a trace (e.g., track an execution path) through the source code 120, which may include the set of related files 122, to identify a set of relational dependencies (e.g., inter-dependencies) between the set of logical components to understand (e.g., memorialize, model, simulate, write, output, display) how the set of logical components is interrelated at runtime. For example, the set of relational dependencies between the set of logical components can indicate which subroutine within the source code 120 depends on or calls which subroutine within the source code 120 during runtime. For example, the trace may include a valid or complete trace and not an invalid or incomplete trace. For example, the trace may be enabled at run-time or at compile-time.

The trace may include a single trace or a set of sub-traces traceably branching out throughout the source code 120. The set of sub-traces may be running serially. The set of sub-traces may be running in parallel. The sub-traces may be sourced from a set of computing threads of execution or processes executed or run by or within the source control repository 112, the source code editor 114, the requirements editor 116, or otherwise in the computing instance 108, which may accelerate how much time the trace takes to complete.

The trace, which may include looping, iteration, or recursion among the set of logical components in the source code 120, may be run through the source code 120 from a starting point in the source code 120 through all possible routes in the source code 120 until the trace has reached an end point (e.g., an ultimate end point) in the source code 120 (e.g., based on logical conclusion thereof). This path of execution between the starting point and the end point may include the single trace or the set of sub-traces, as disclosed herein.

Figure 10:
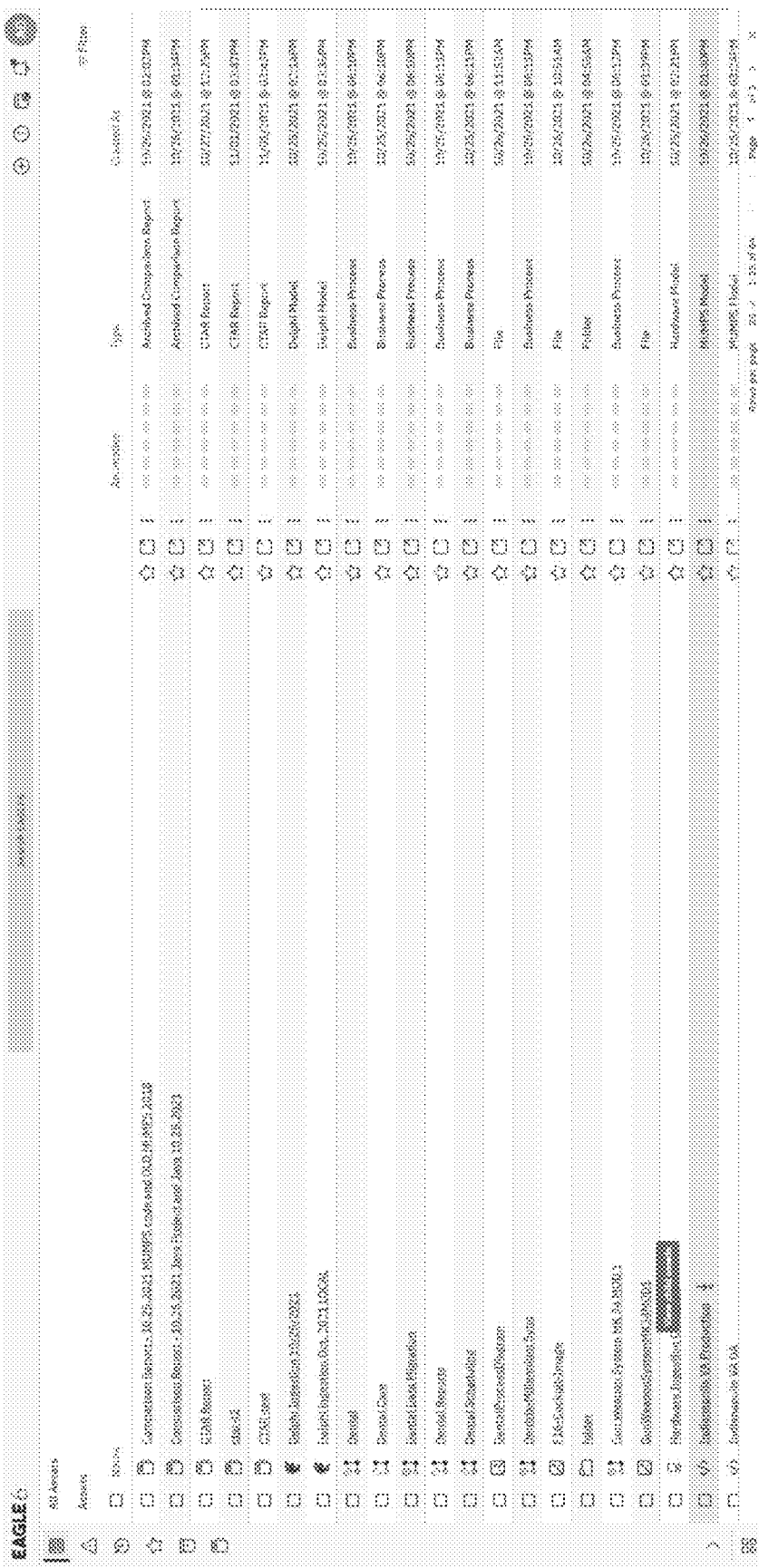
Figure 11:
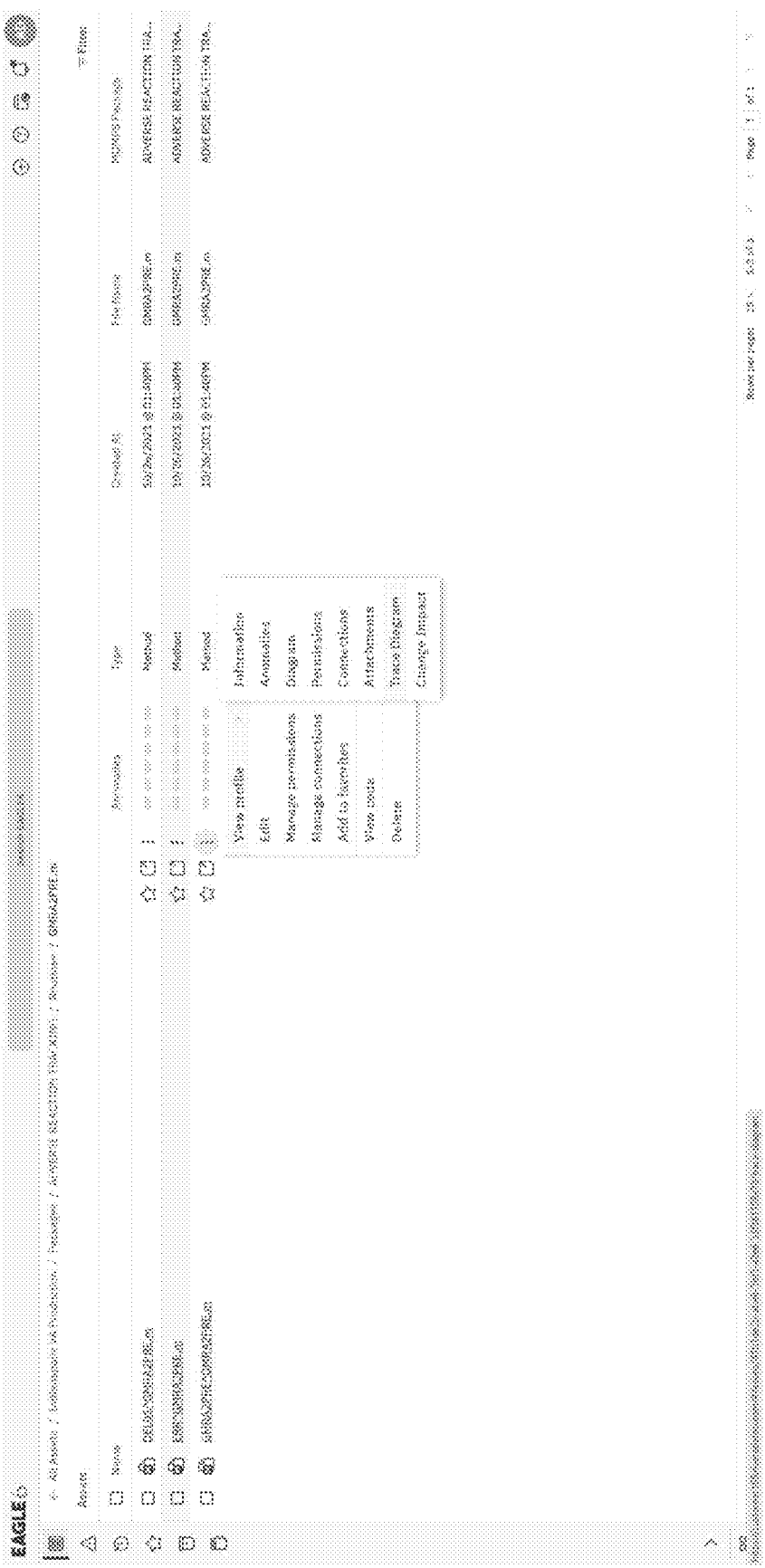
Figure 12:
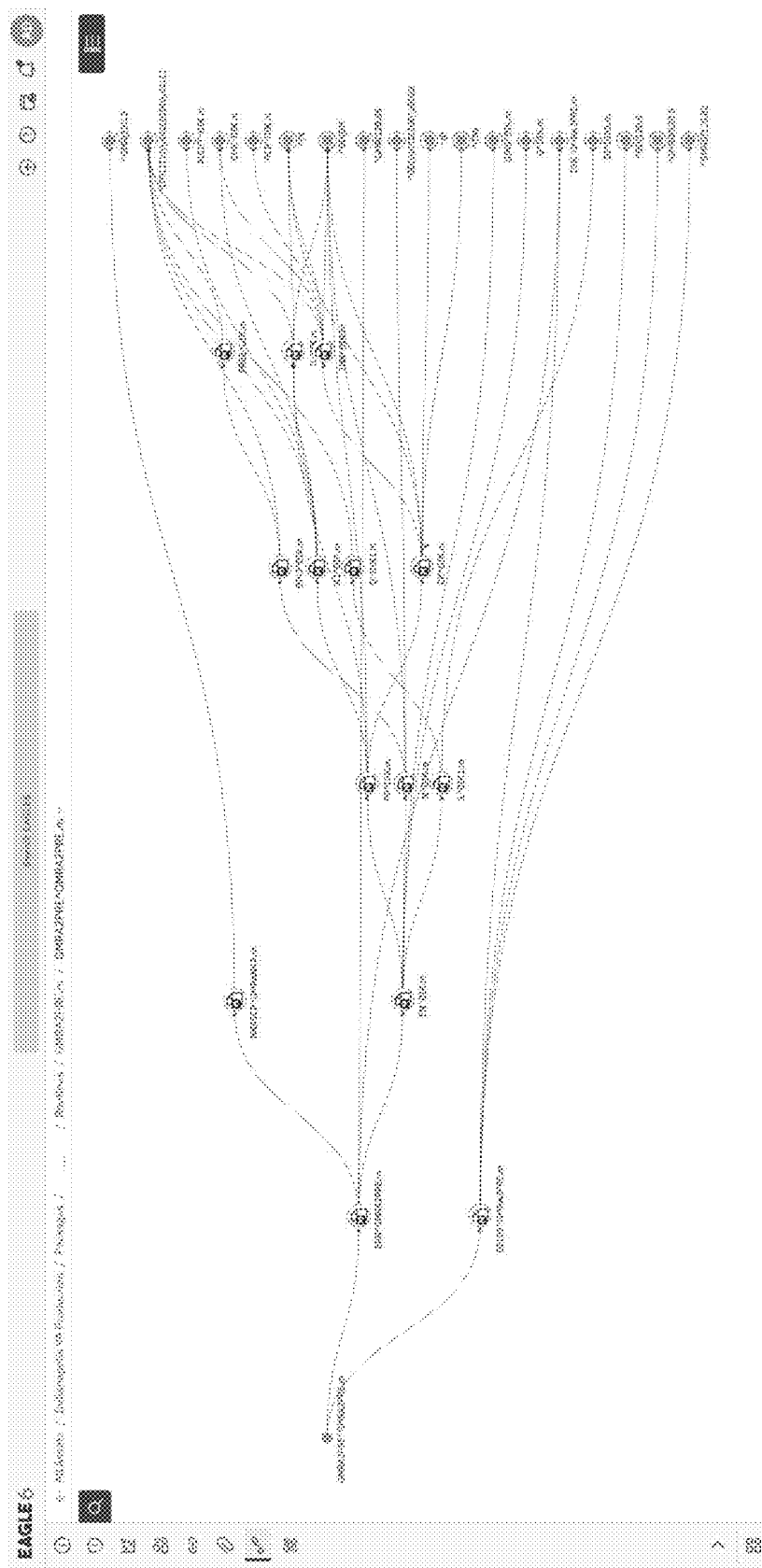
Figure 13:
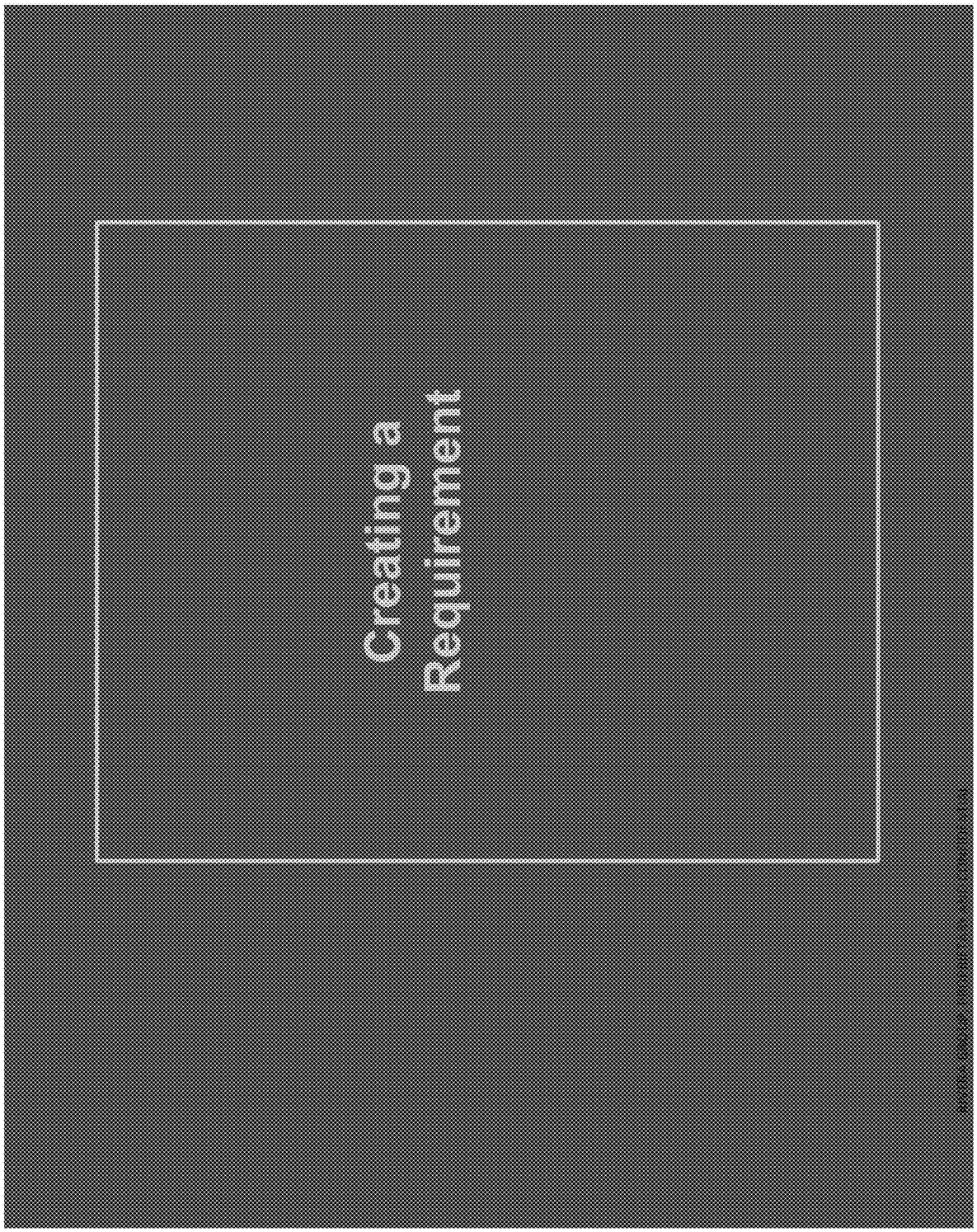
Figure 15:
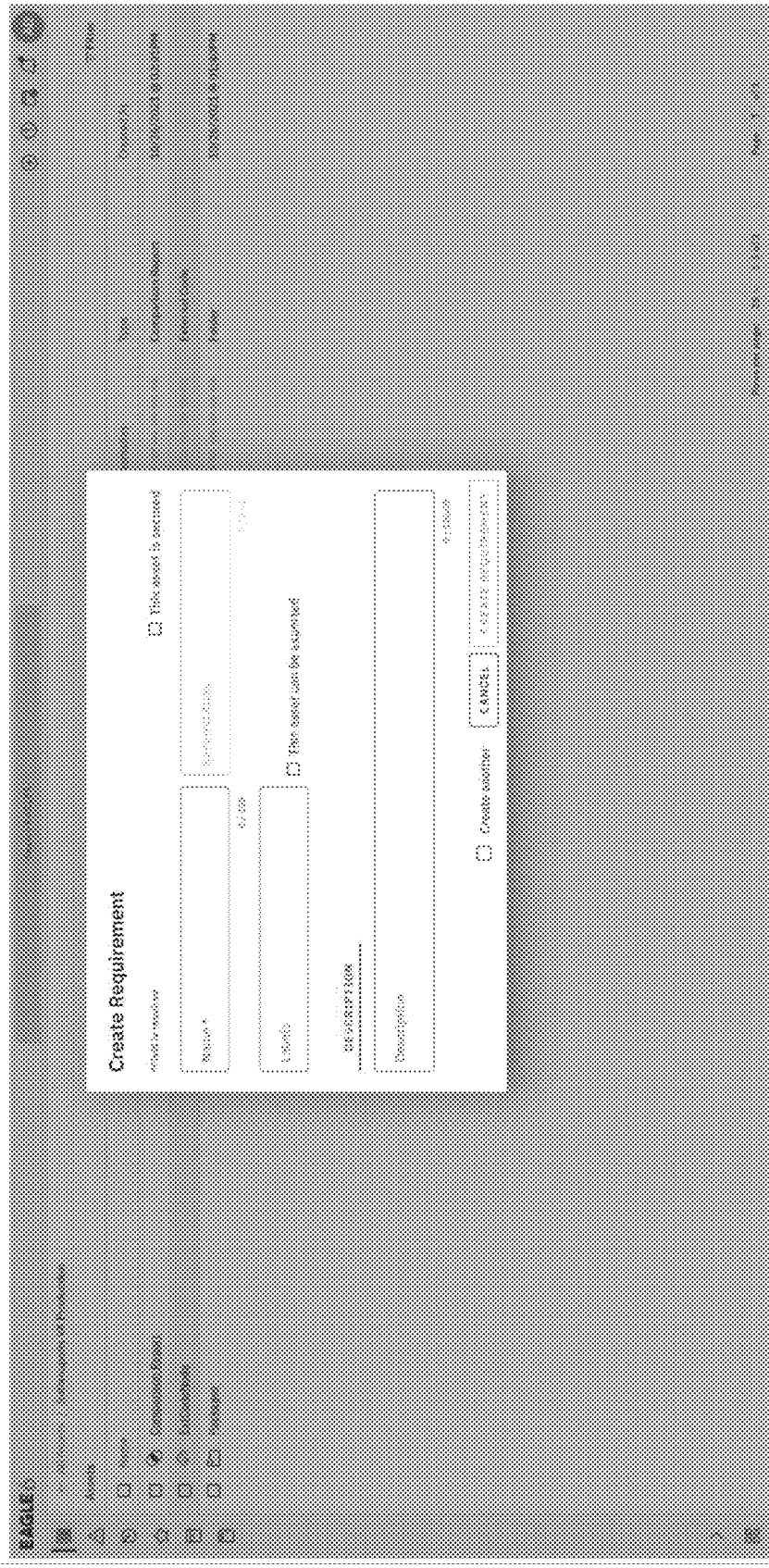
Figure 17:
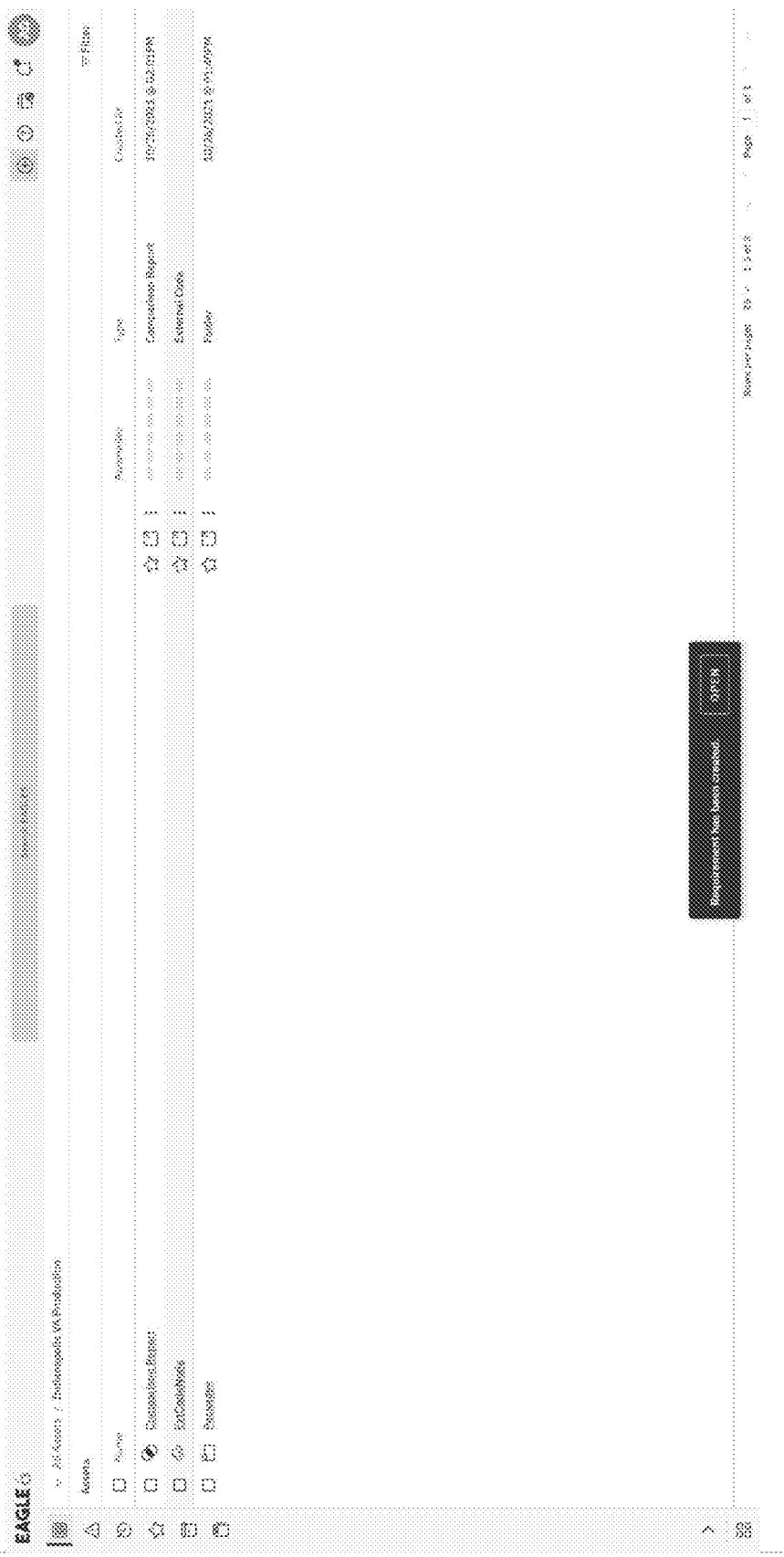
Figure 18:
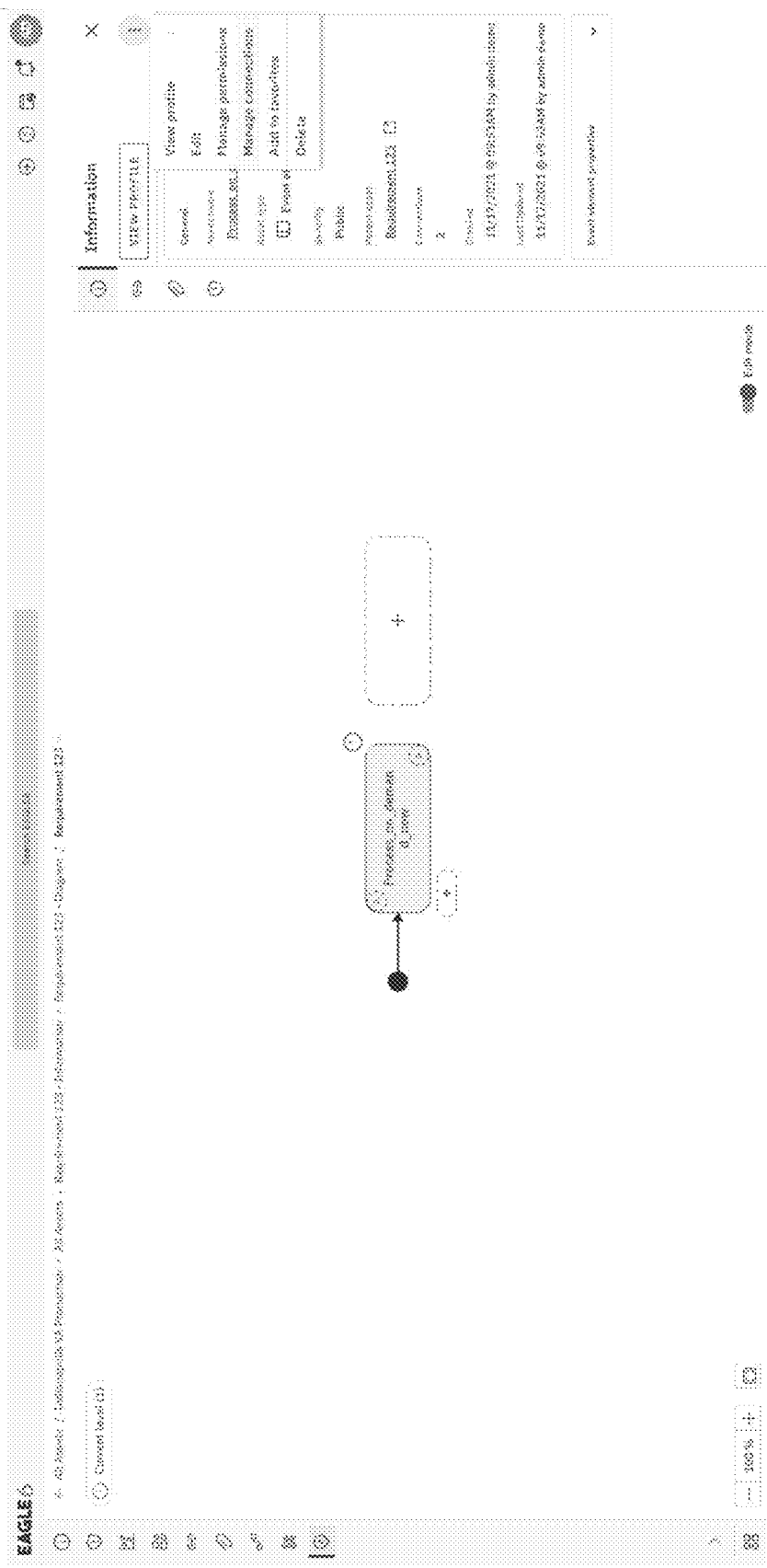
Figure 19:
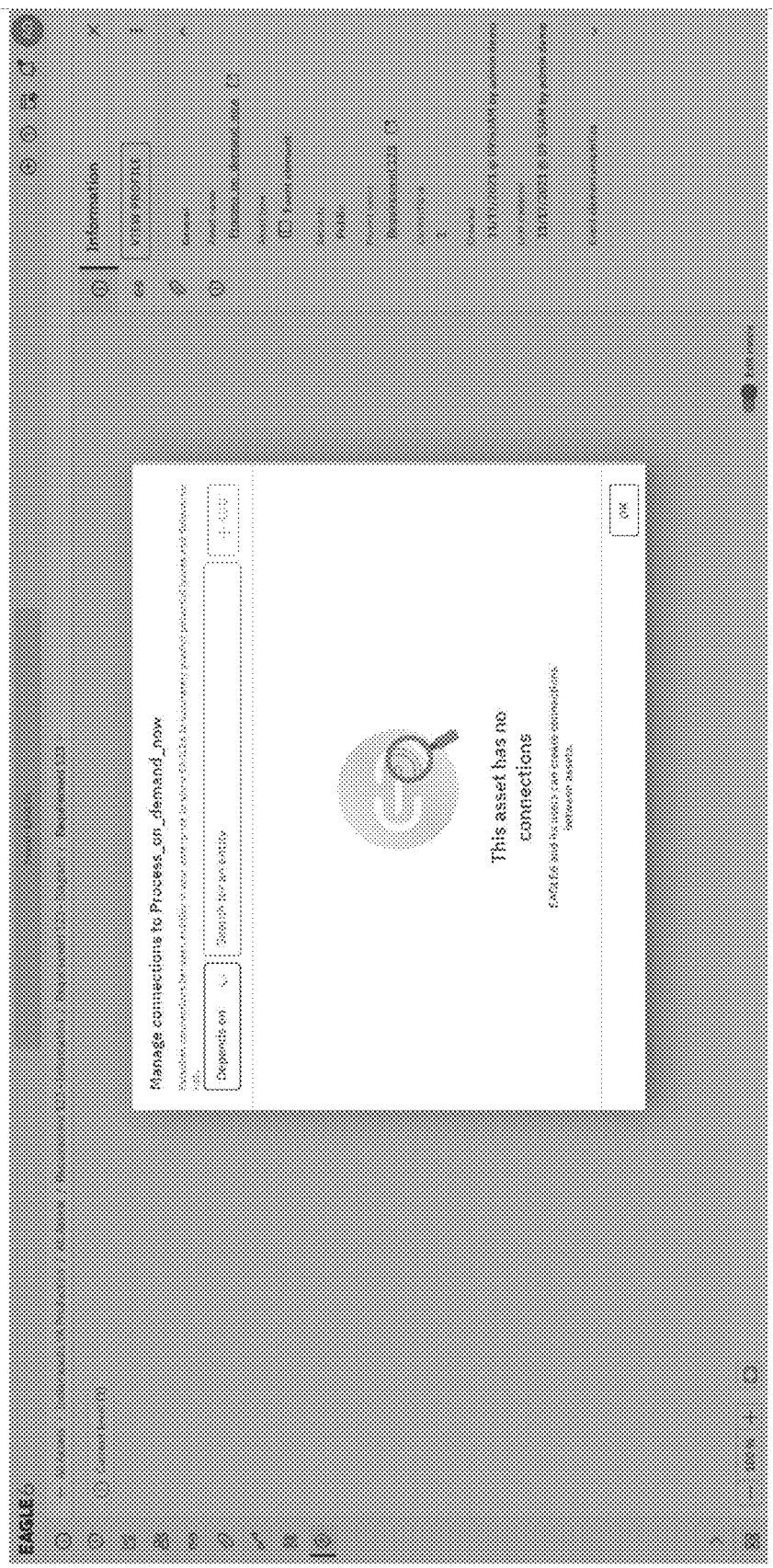
Figure 20:
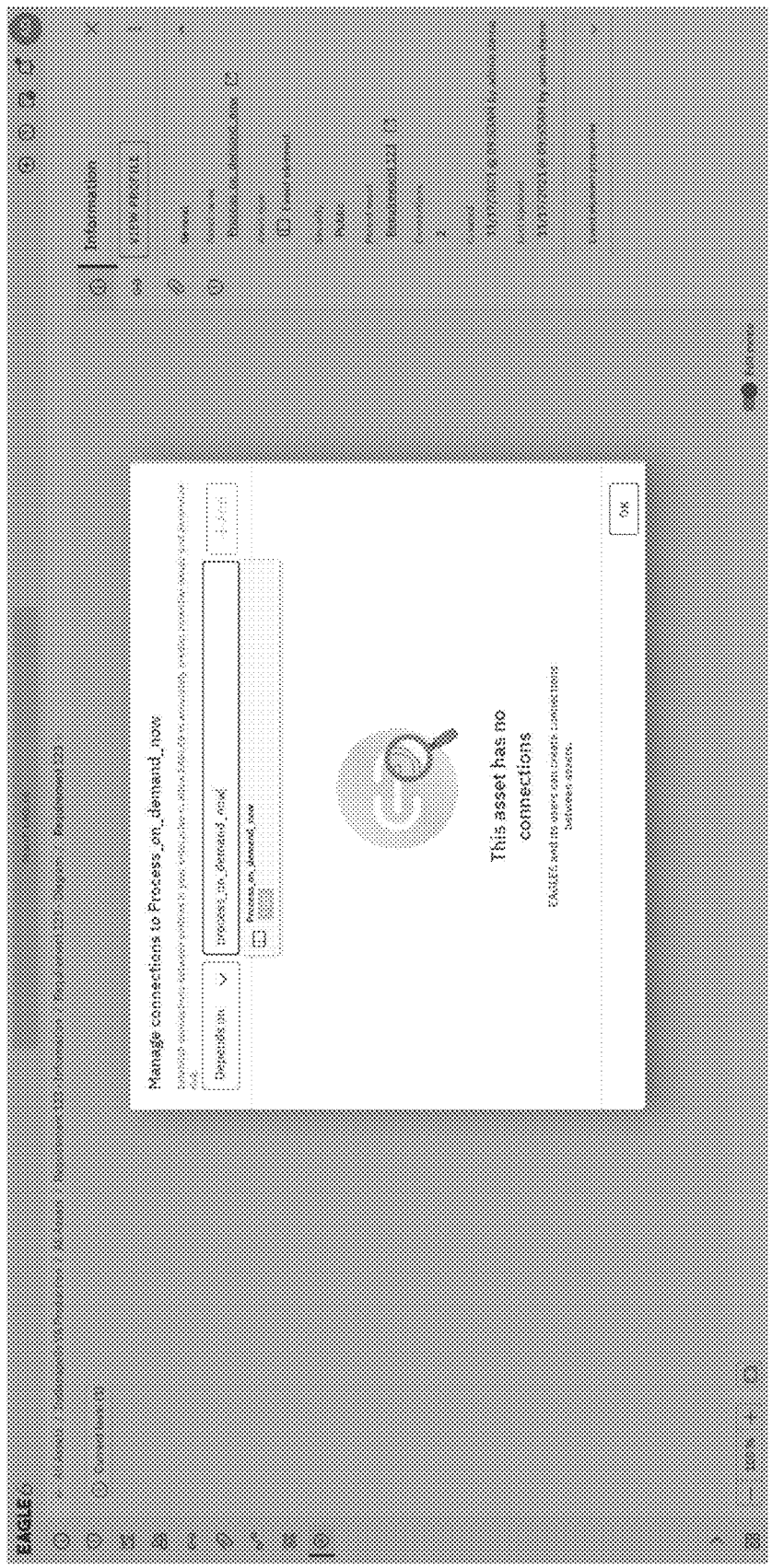
Figure 21:
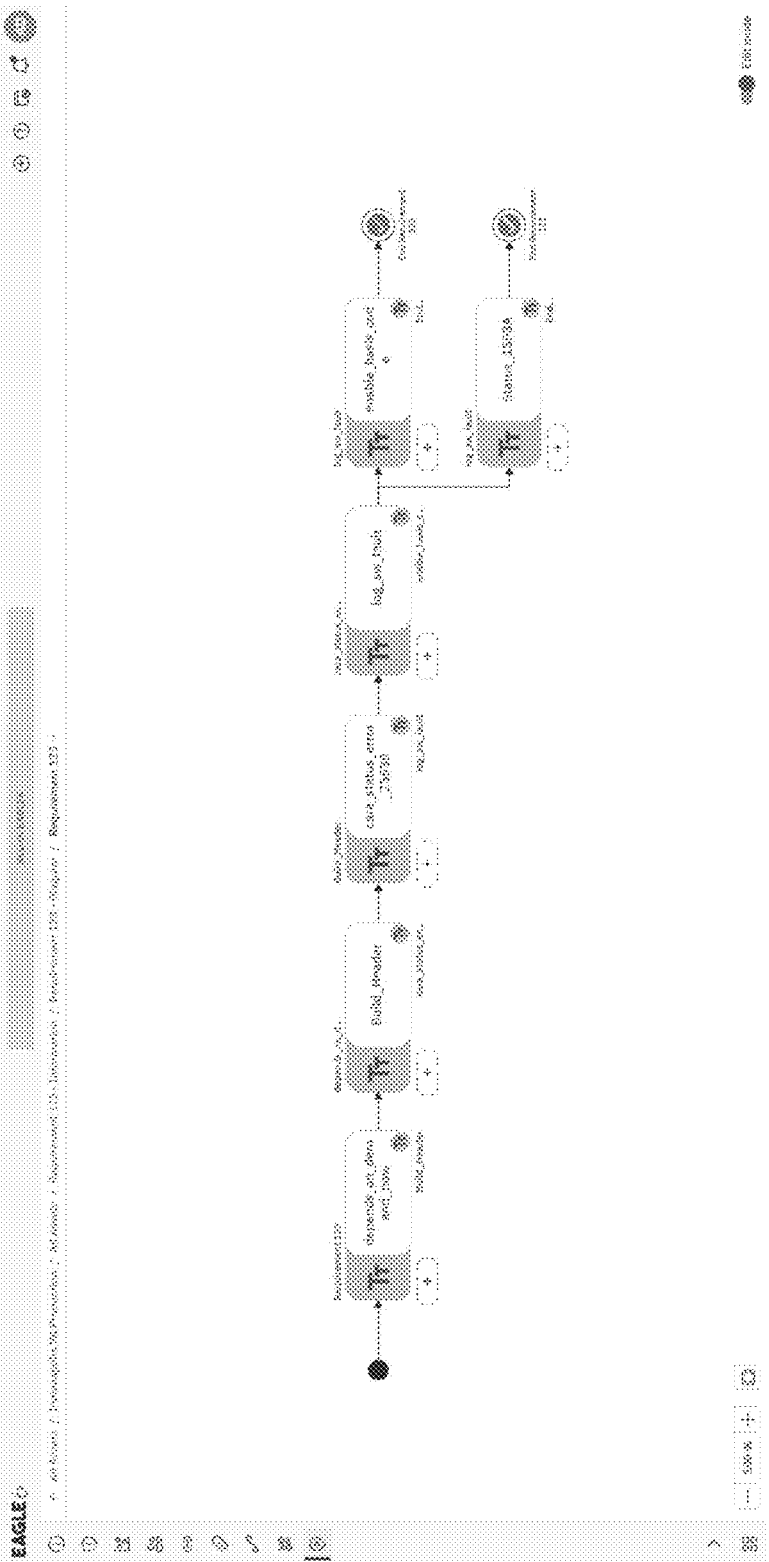
Figure 22:
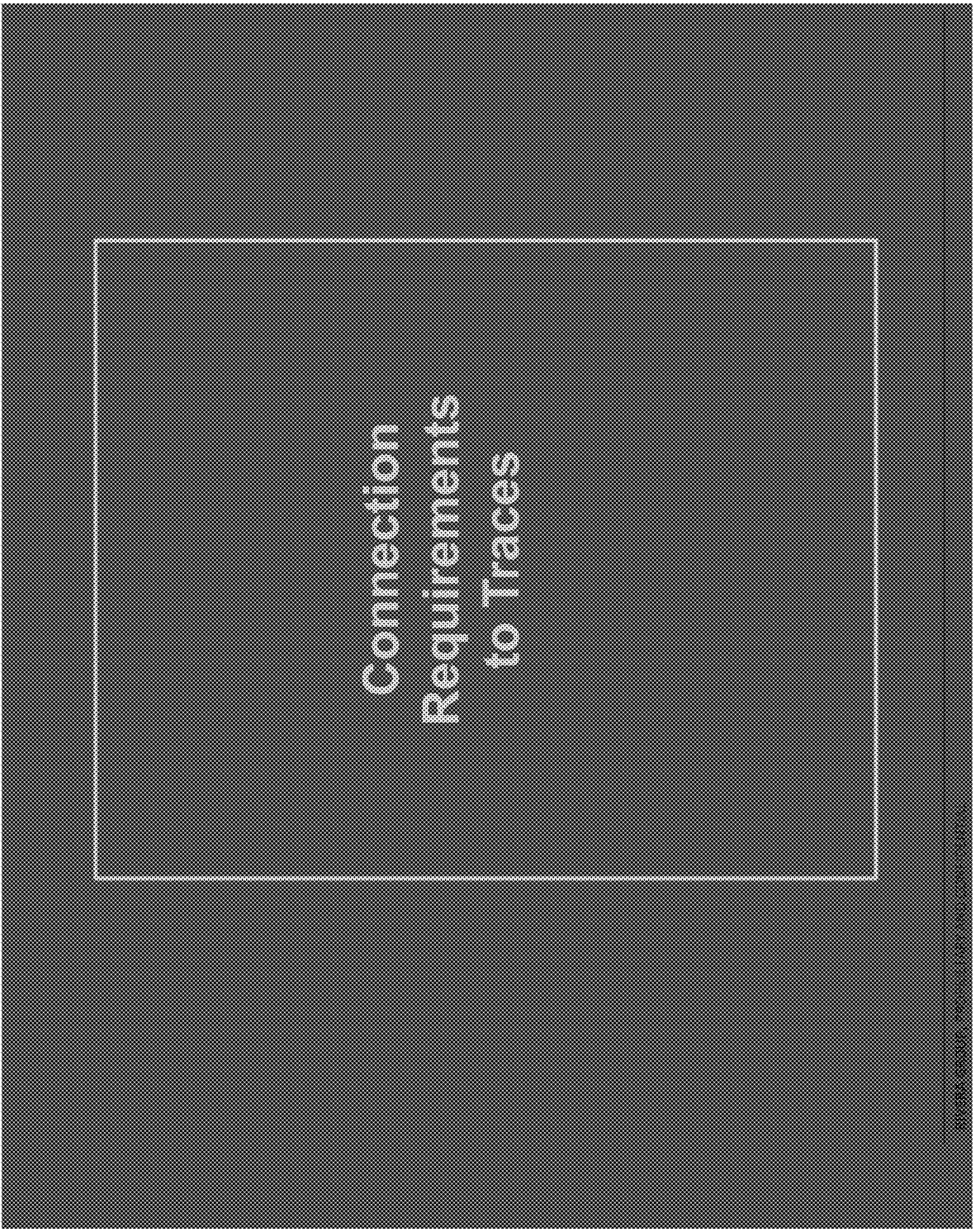
Figure 23:
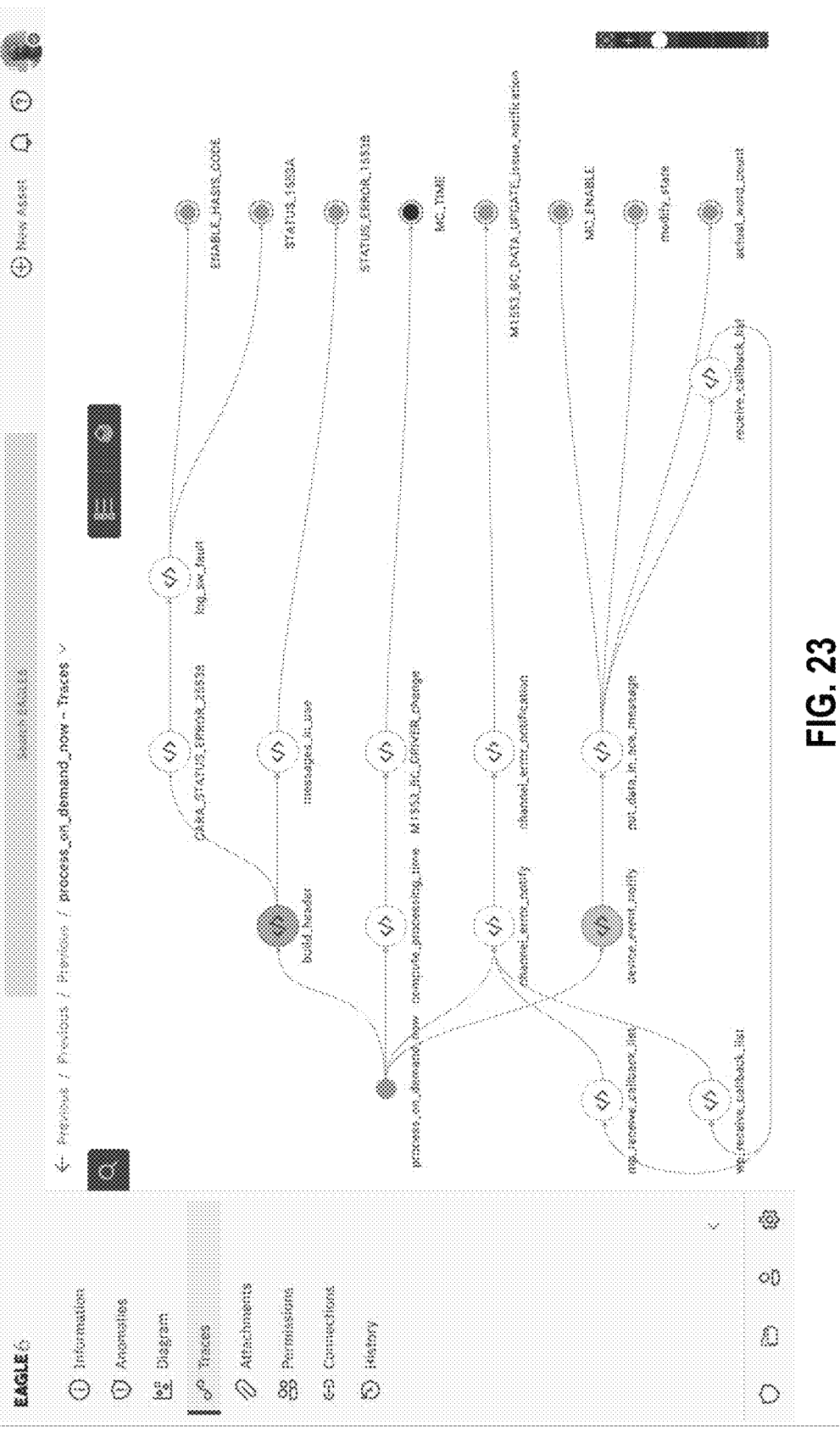
Figure 24:
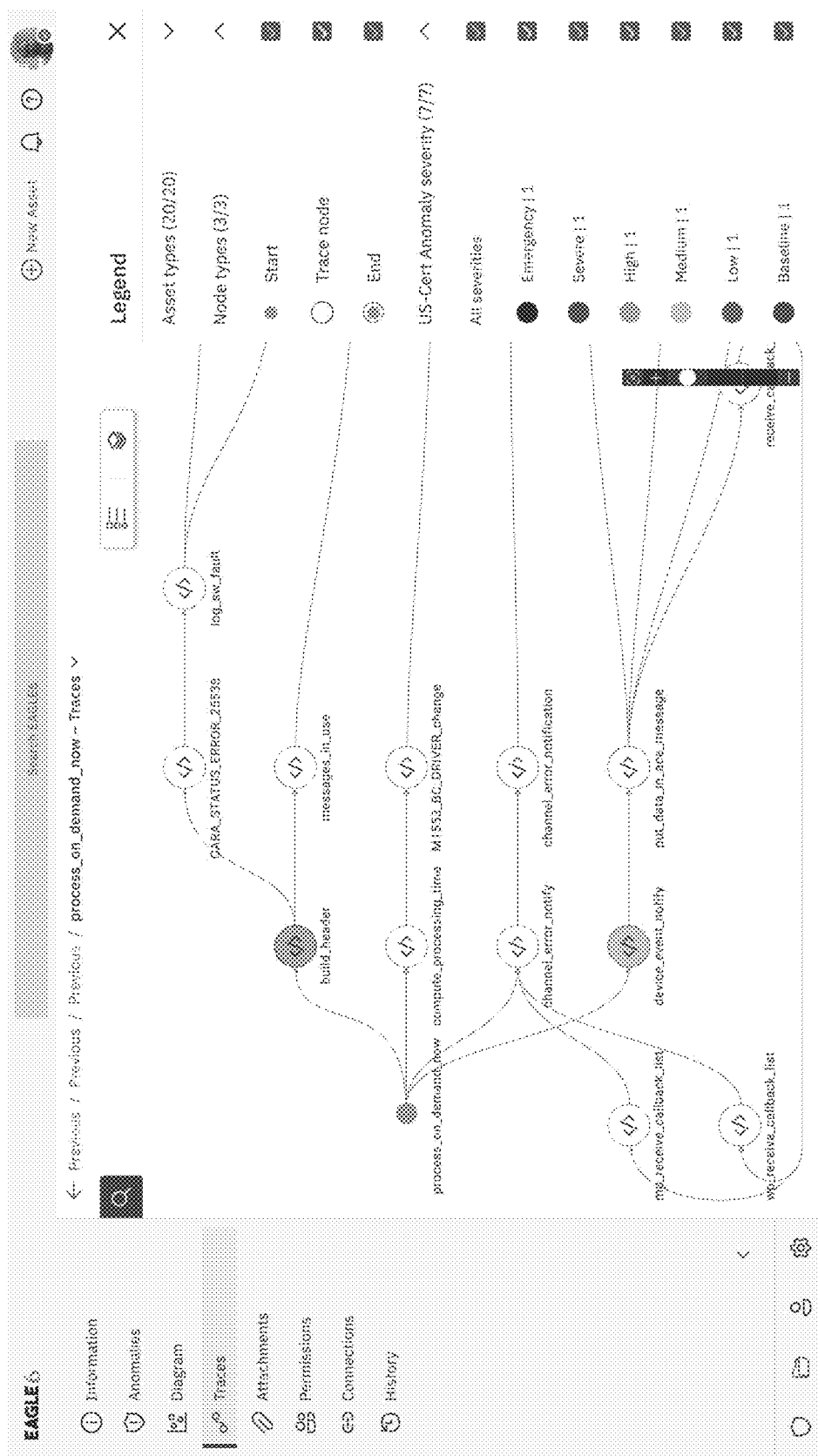
Figure 25:
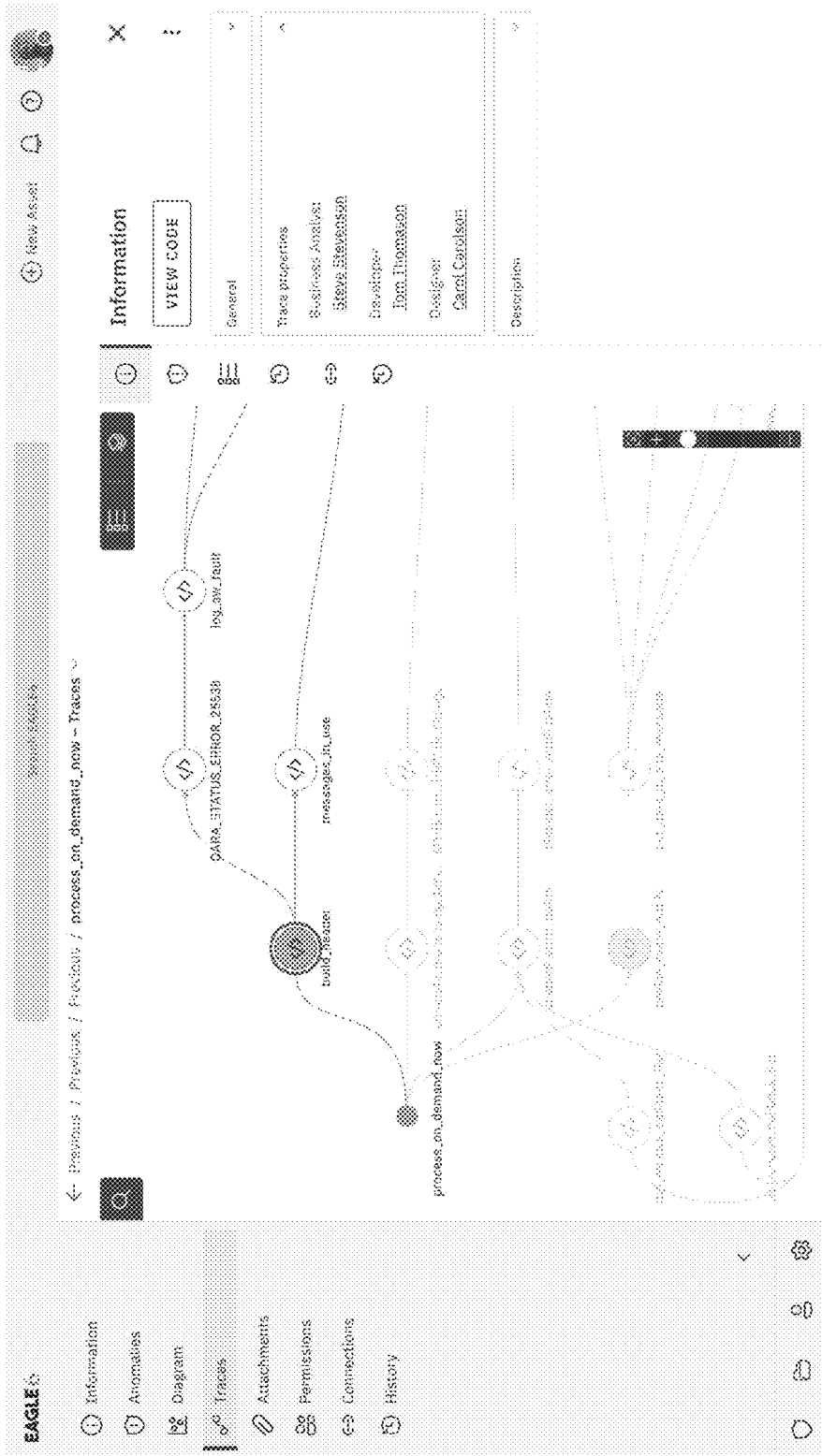
Figure 26:
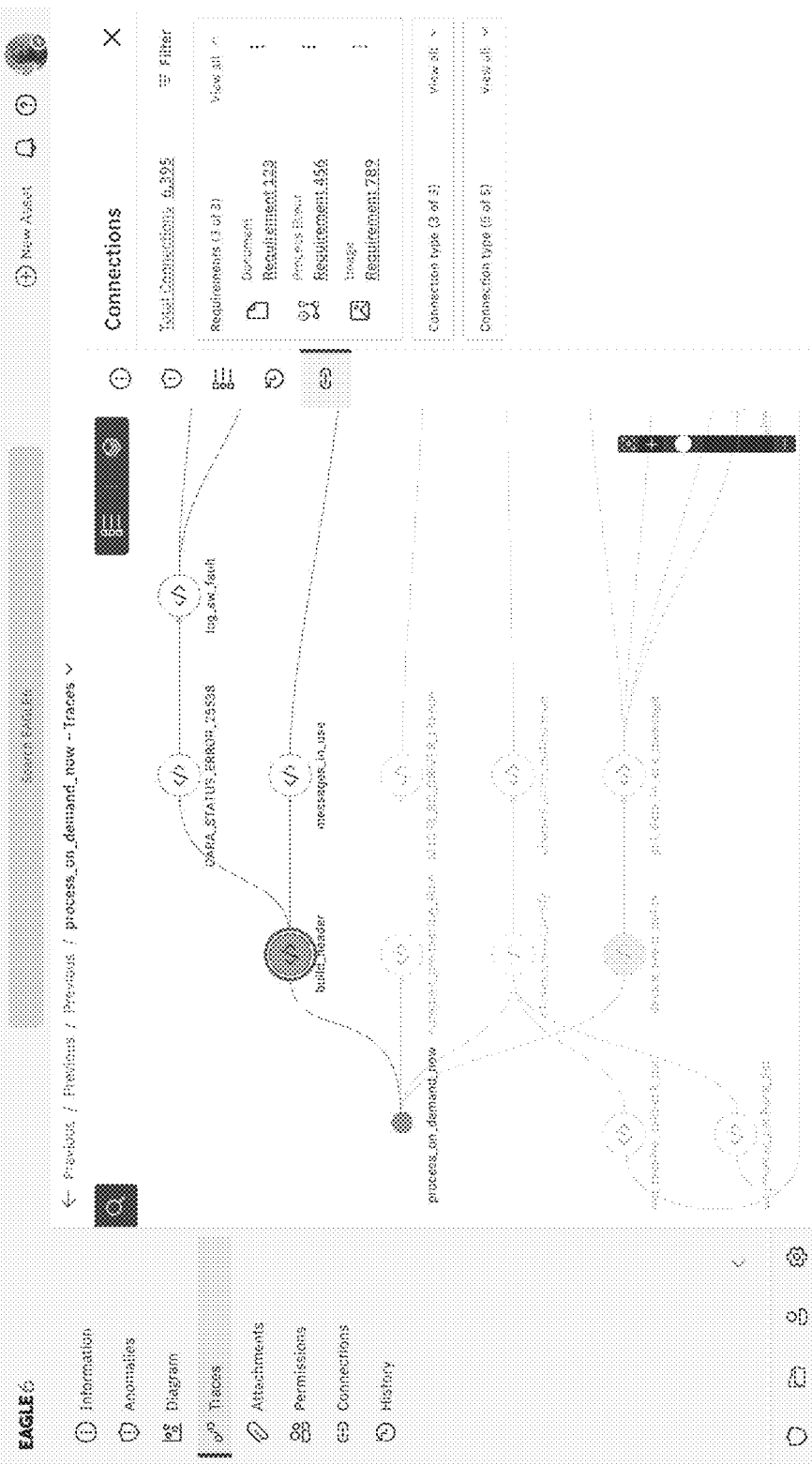
Figure 27:
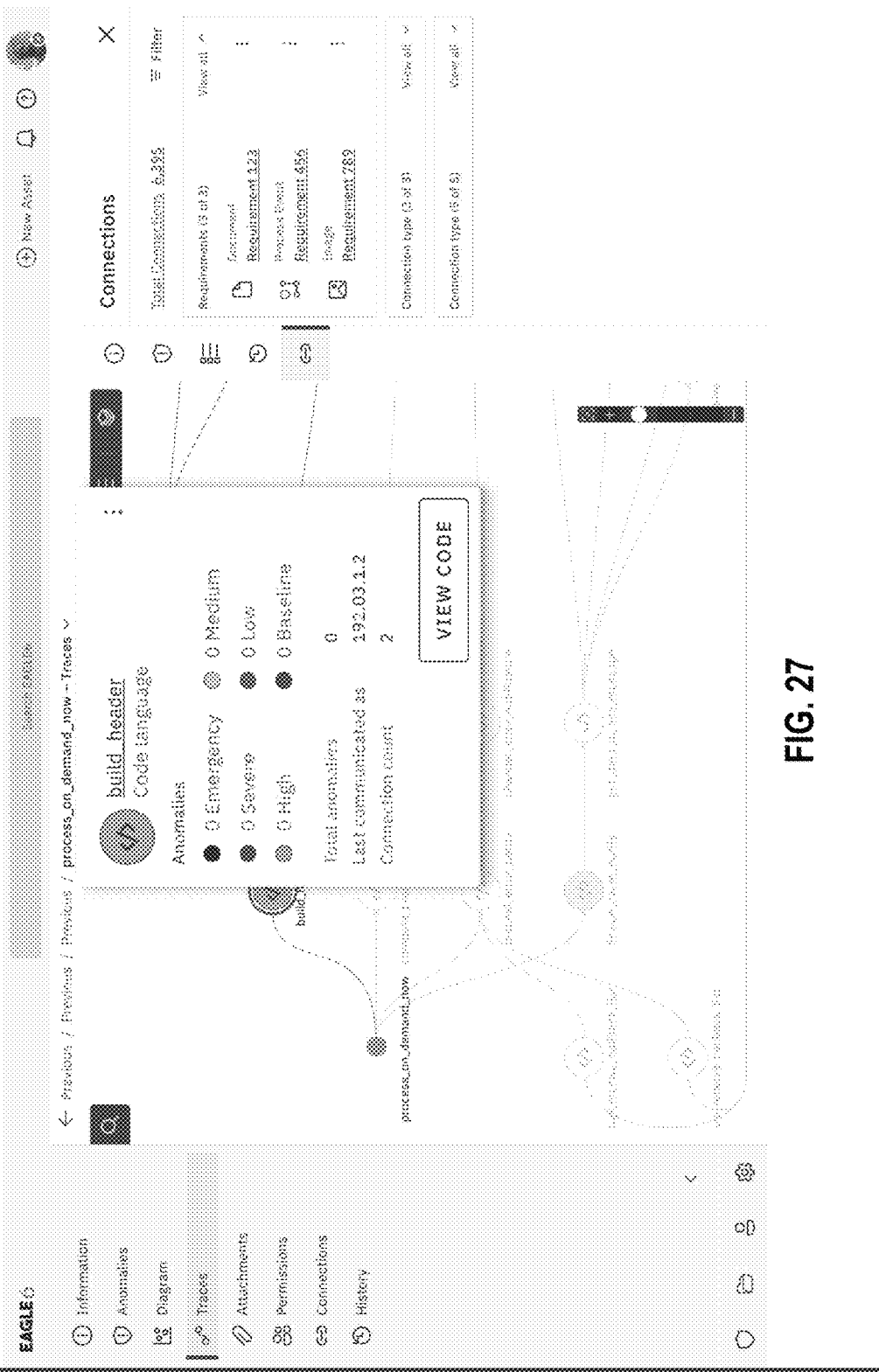
Figure 28:
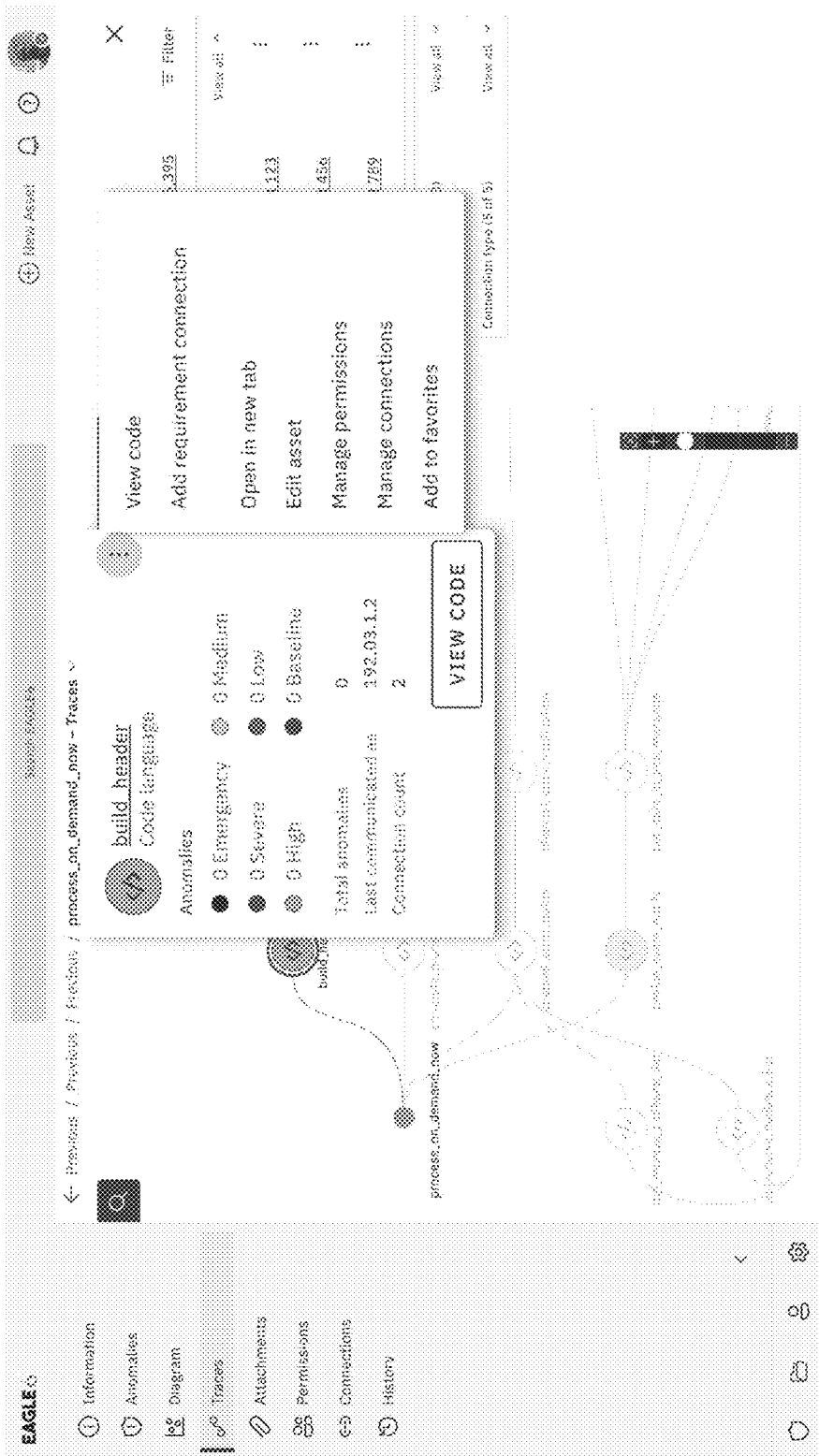
Figure 29:
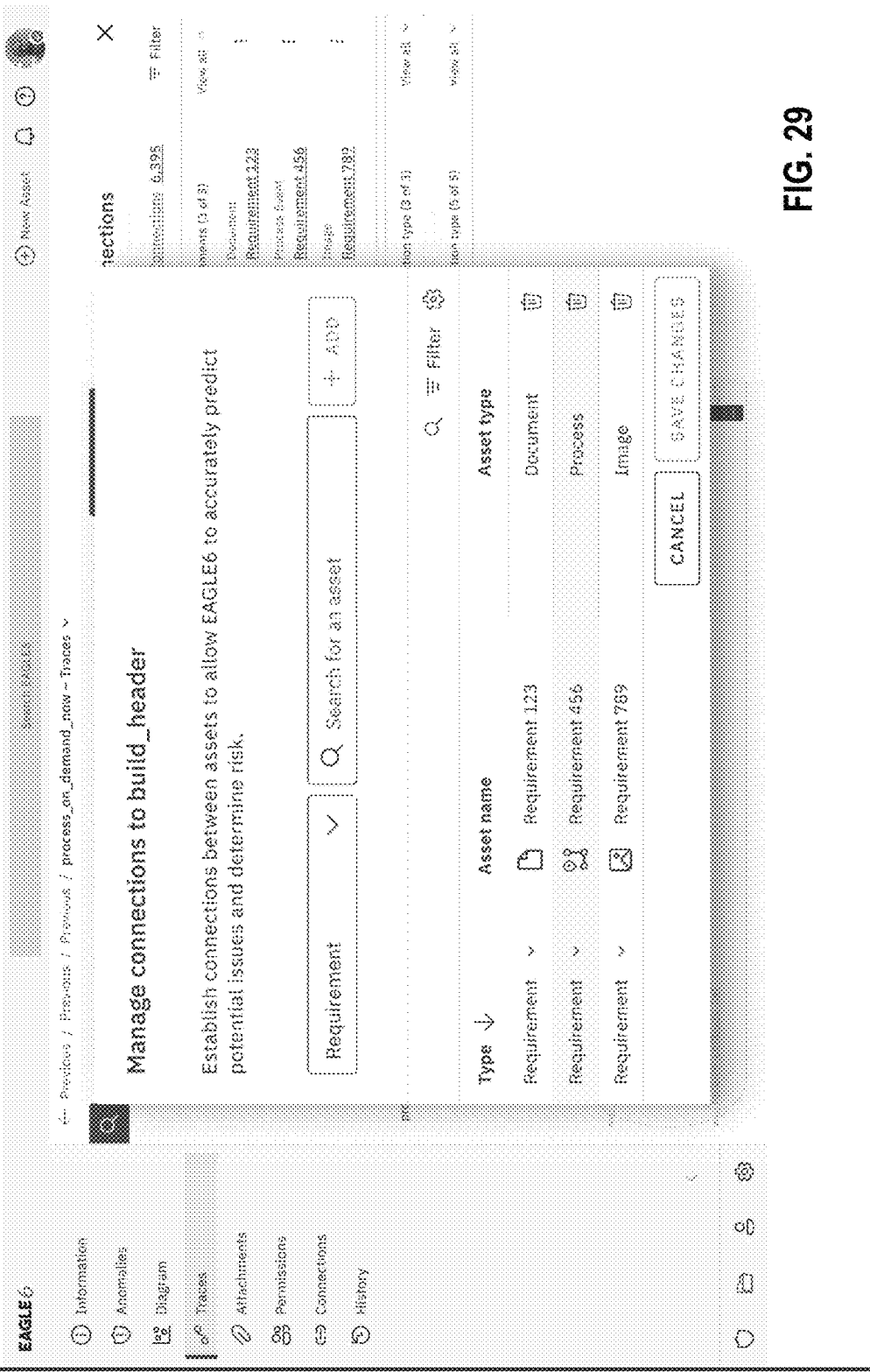
Figure 30:
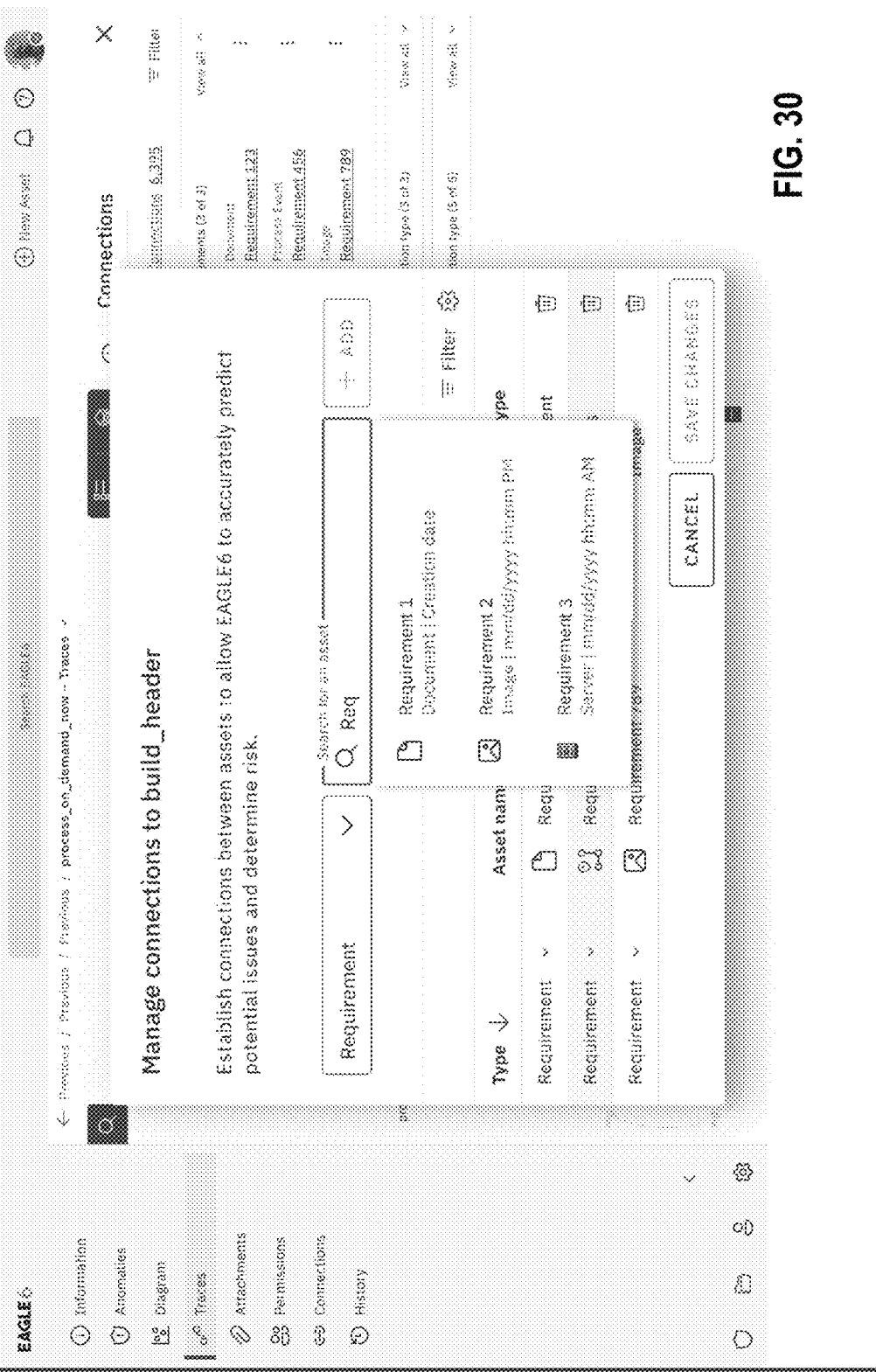
Figure 31:
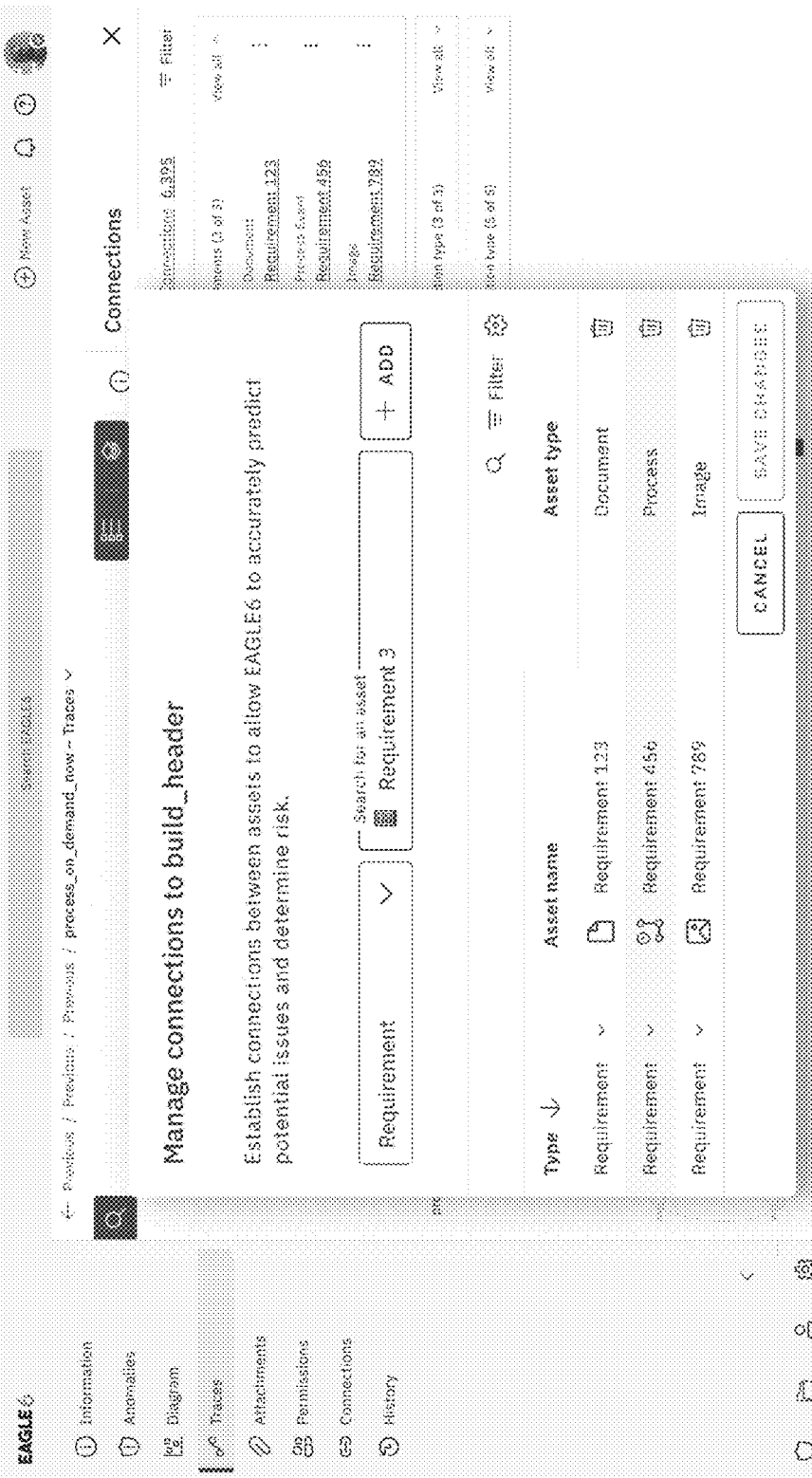
Figure 32:
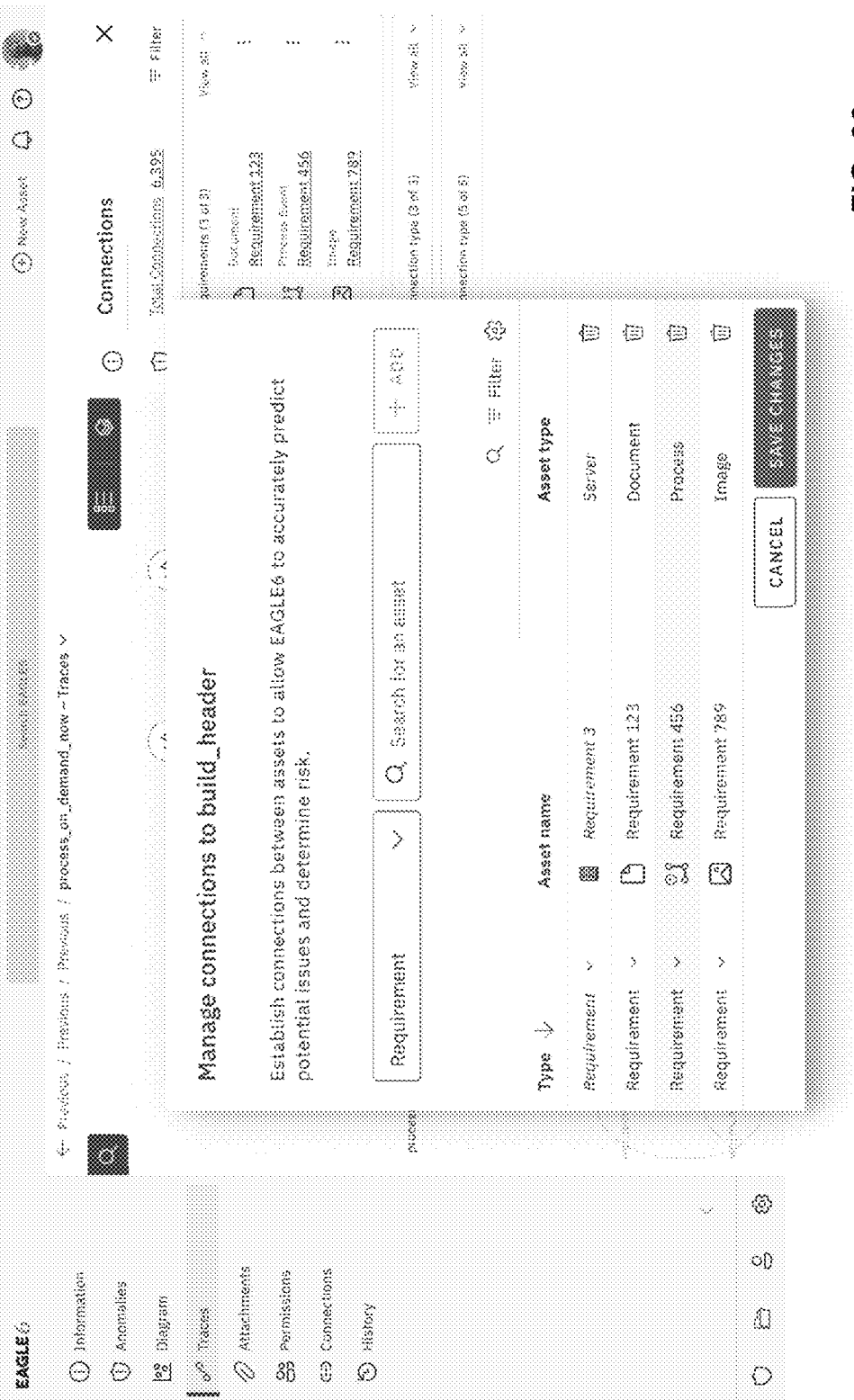
Figure 33:
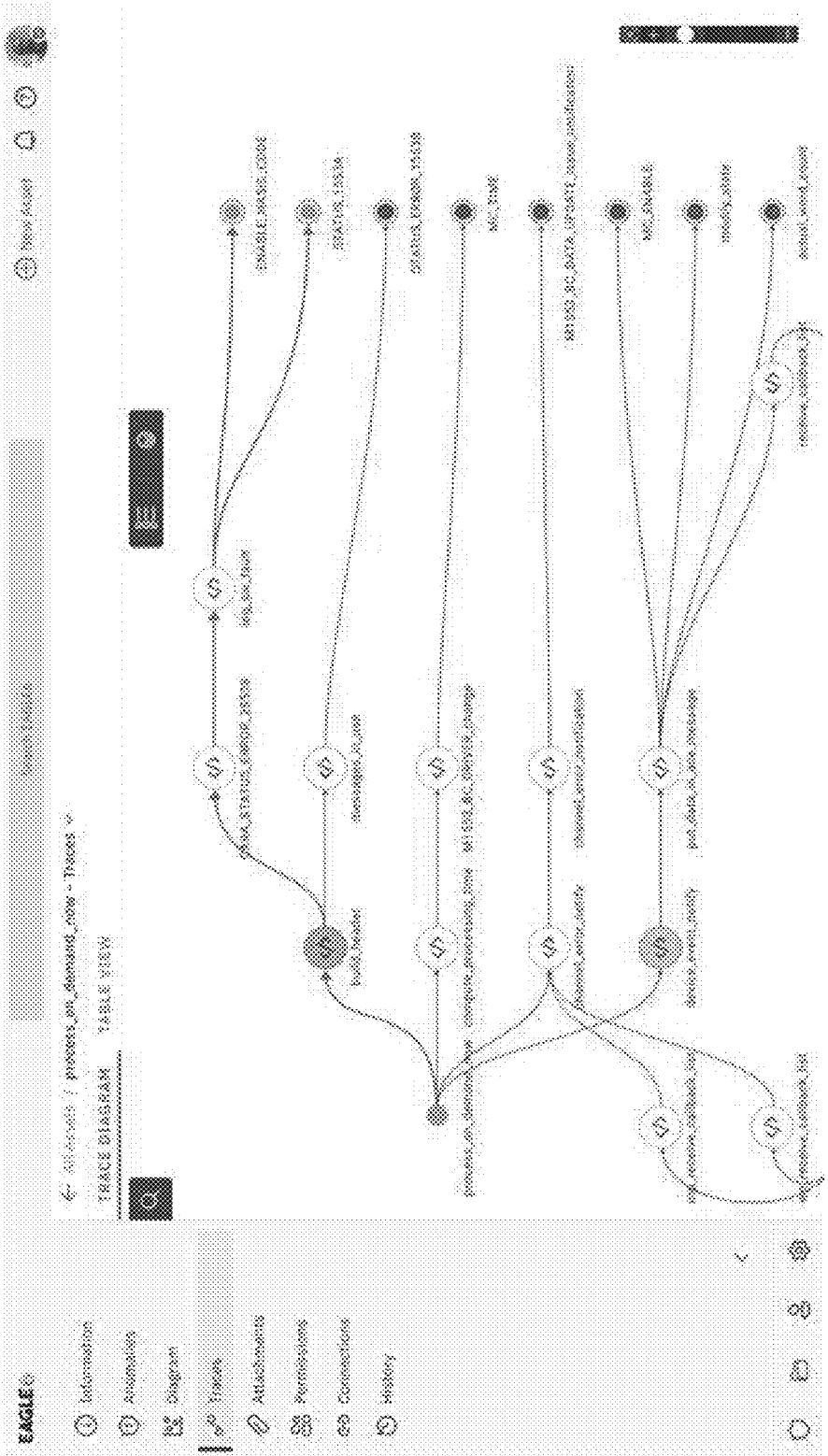
Figure 34:
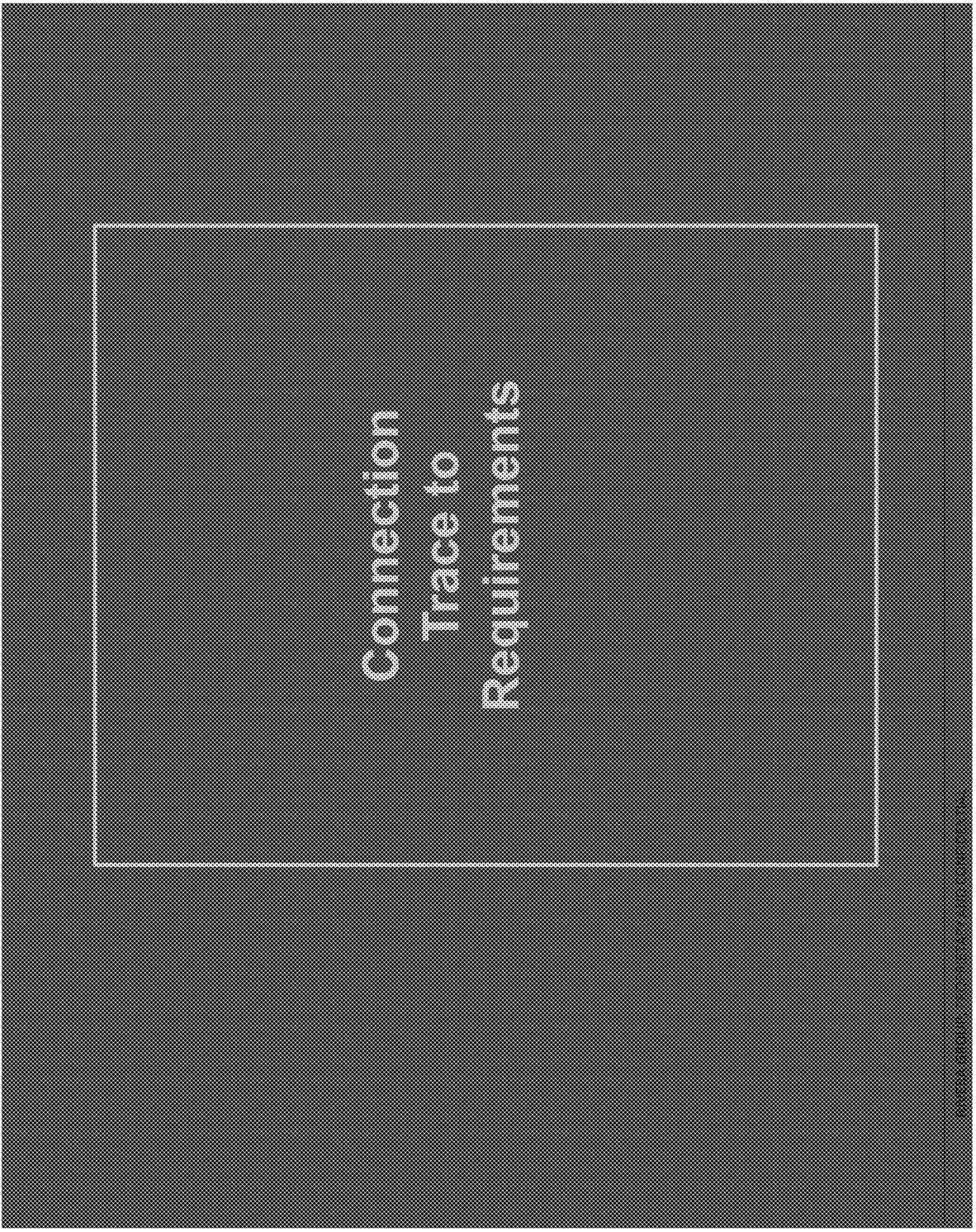
Figure 35:
Figure 36:
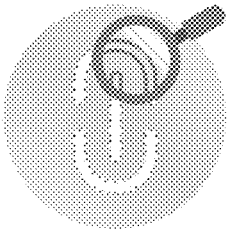
Figure 38:
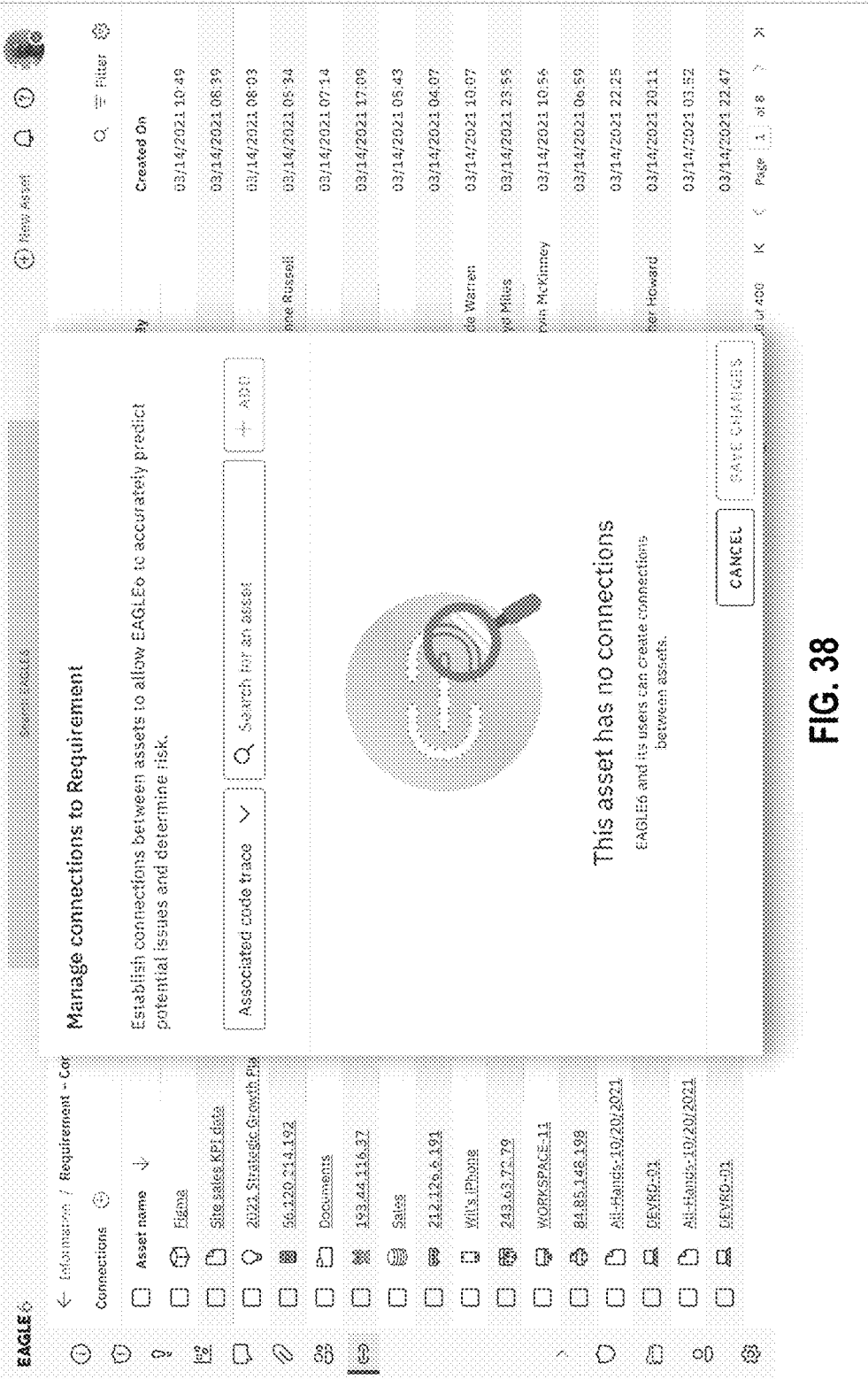
Figure 39:
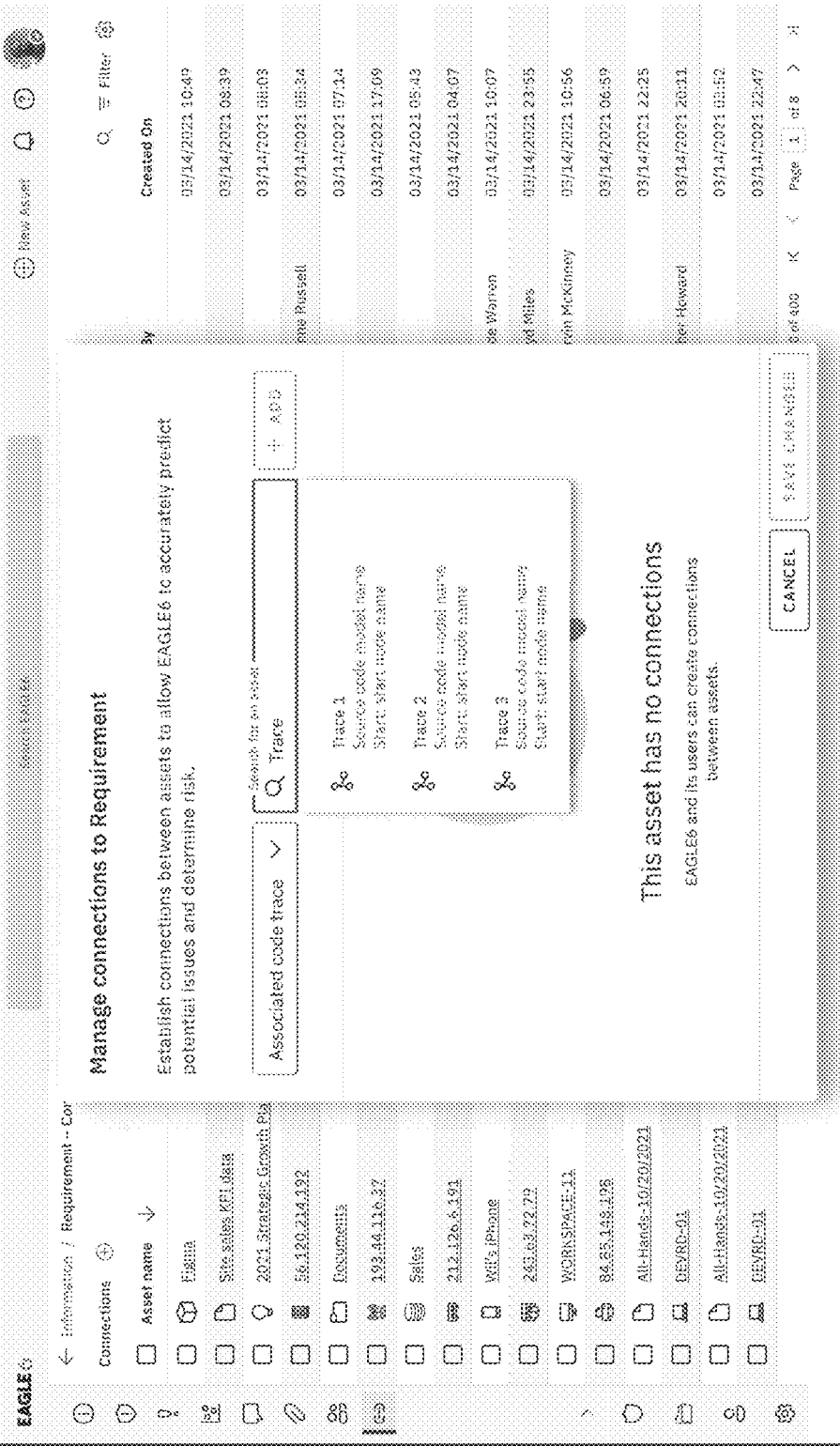
Figure 41:
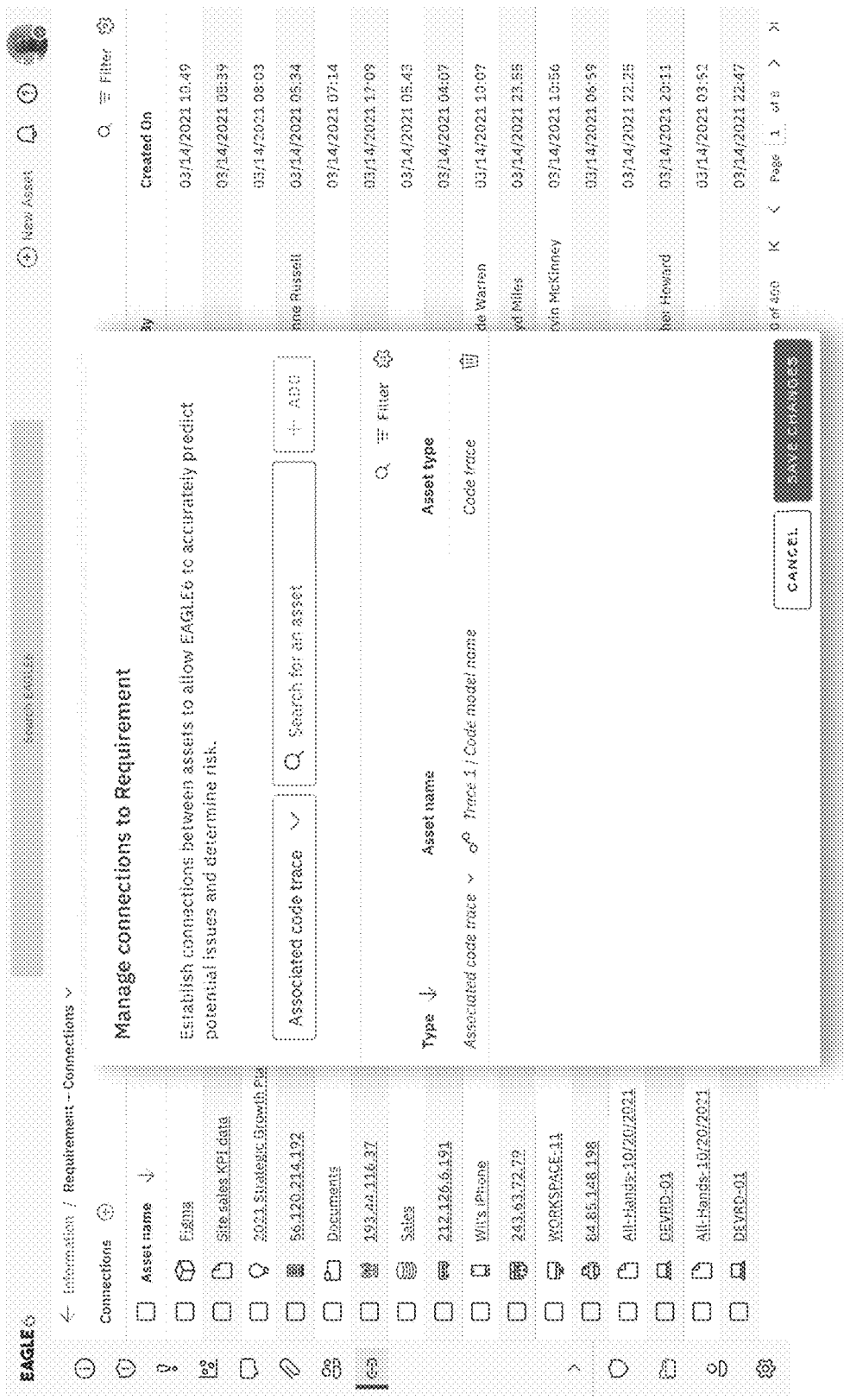
Figure 42:
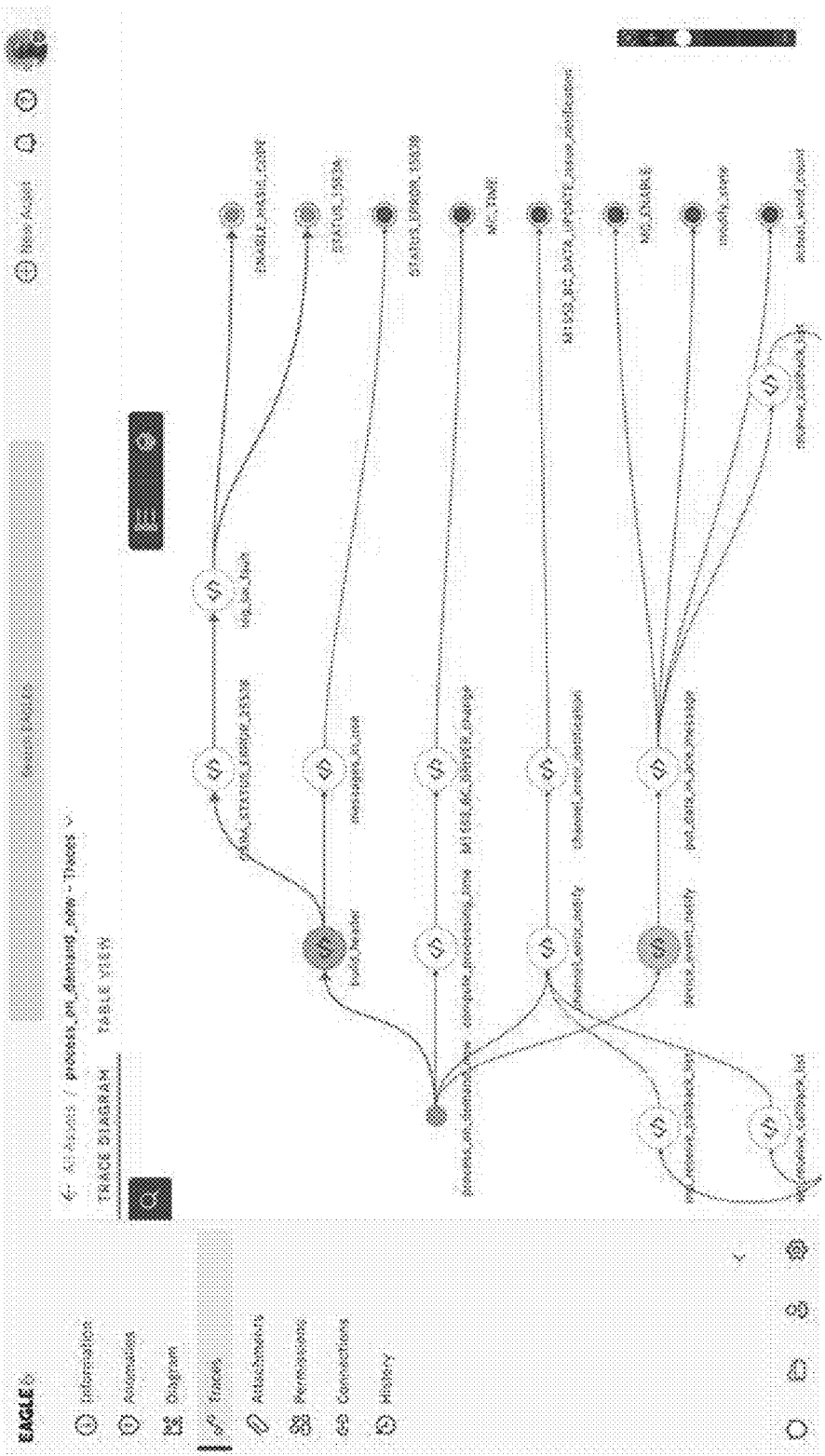

The starting point may be user-selected via the first client 104 or the N client 106 over the network 102, as shown in FIGS. 8-46. For example, such selection can include accessing or operating a browser for a set of identifiers corresponding (e.g., by name) to the set of logical components to select a respective identifier corresponding to a respective logical component to be the starting point, as shown in FIGS. 10-11. Likewise, such selection can include accessing or operating the source code editor 114 to select a point or segment in the source code 120 from which or from which respective logical component containing the point or the segment the trace should begin (the starting point). The trace can run through or iterate until all possible routes in the source code 120 are identified and the trace has reached its end point (e.g., an ultimate end point) in the source code 120. The end point may be a single point in the source code 120 or multiple different points in the source 120.

Based on the trace being completed (e.g., after the end point has been reached), the computing instance 108 may generate a temporal model (e.g., a graph, a tree) having a set of vertices (e.g., a set of nodes) and a set of edges connecting the set of vertices. The set of vertices may correspond to the set of logical components and the set of edges may inter-relationally, logically, or directionally model the set of logical components in terms of execution at runtime after the trace is completed (e.g., how program execution flows among the set of logical components). The temporal model may be visually or tactfully perceived (e.g., via a display, a haptic display, a tactile display, a Braille interface). As shown in FIG. 4, the temporal model may include the set of vertices corresponding to all logical components identified in T1 (A, B, C, D, E) and T2 (A, F, C, D, E) and the set of edges may inter-relationally, logically, or directionally model which respective logical component (A, B, C, D, E, F) calls which respective logical component (A, B, C, D, E, F), as disclosed herein. Note that the graph may have a single vertice correspond to a set of shared logical components, although this is not mandatory. For example, the graph may include the single vertical correspond to a logical component A common to T1 and T2, although this is not required and the graph may include a vertice AT1 and AT2. Similar reasoning applies to the set of edges.

In block 203, the architecture 100 enables an identification of assertion trace sets to utilize the temporal model of the all possible software traces to identify all software traces that satisfy the assertion of the software specification, as disclosed herein. For example, the set of operational requirements may be depicted as a block diagram having a set of blocks (e.g., rectangles) and a set of connectors (e.g., arrows) directionally interconnecting the set of blocks, where the set of blocks models the set of logical components and the set of connectors models how the set of logical components is logically executed (e.g., which logical component calls which logical component). As such, the computing instance 108 may access the block diagram depicting the set of operation requirements and attempt to match (e.g., by respective identifiers) at least some blocks from the set of the blocks to at least some vertices from the set of vertices in the temporal model of the all possible traces, while also attempting to match at least some connectors, including directionality, from the set of connectors to at least some edges from the set of edges in the temporal model of the all possible software traces. Therefore, whatever blocks in the set of blocks and whatever connectors in the set of connectors match respective vertices in the set of vertices (e.g., by identifiers) and respective edges in the set of edges (e.g., by identifiers and directionality) would identify all software traces that satisfy the assertion of the software specification, i.e., compliance with the set of operational requirements. For example, as shown in FIG. 5, based on the temporal model of the all possible software traces, the computing instance 108 determines that a trace T1 (A, B, C, D, E) satisfies the assertion of the software specification.

In block 204, the architecture 100 enable an identification of assertion violations to identify all remaining software traces other than the all software traces that satisfy the assertion of the software specification, as disclosed herein. Whatever software traces that may remain in the temporal model of the all possible traces after the block 203 is performed would identify all software traces that do not satisfy the assertion of the software specification, i.e., lack of compliance with the set of operational requirements. Whatever software traces that satisfy the assertion of the software specification and whatever software traces that do not satisfy the assertion of the software specification may be distinctly output (e.g., displayed) for the user to readily distinguish (e.g., based on color). For example, as shown in FIG. 6, based on the temporal model of the all possible software traces, the computing instance 108 determines that a trace T2 (A, F, C, D, E) is remaining as not satisfying the assertion of the software specification and therefore is visually distinguishable from the Trace T1 accordingly.

Figure 7:
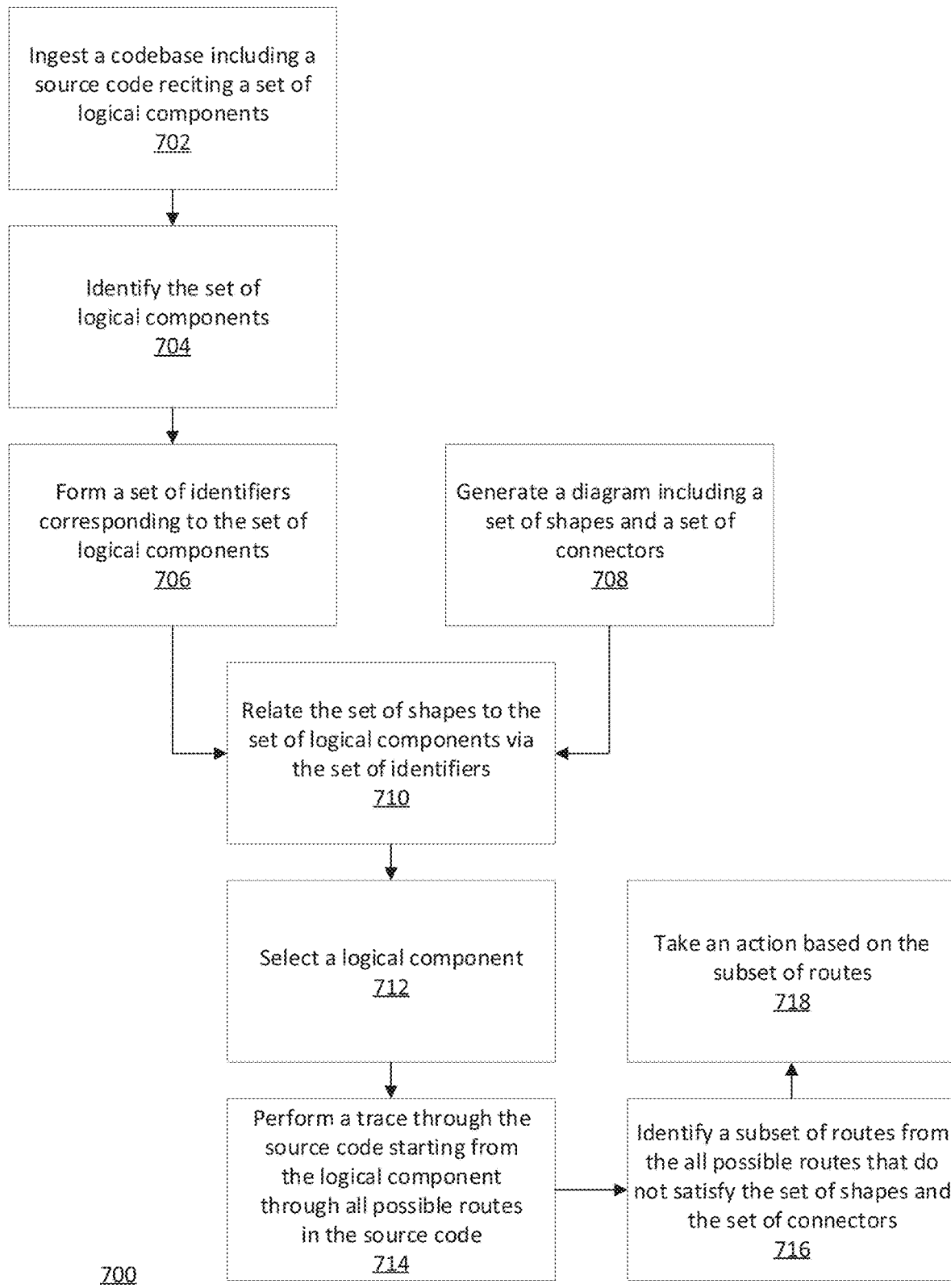
FIG. 7 shows a flowchart of an embodiment of a process for tracing source code to determine compliance or lack thereof with operational requirements therefor according to this disclosure.
Figure 8:
Figure 9:
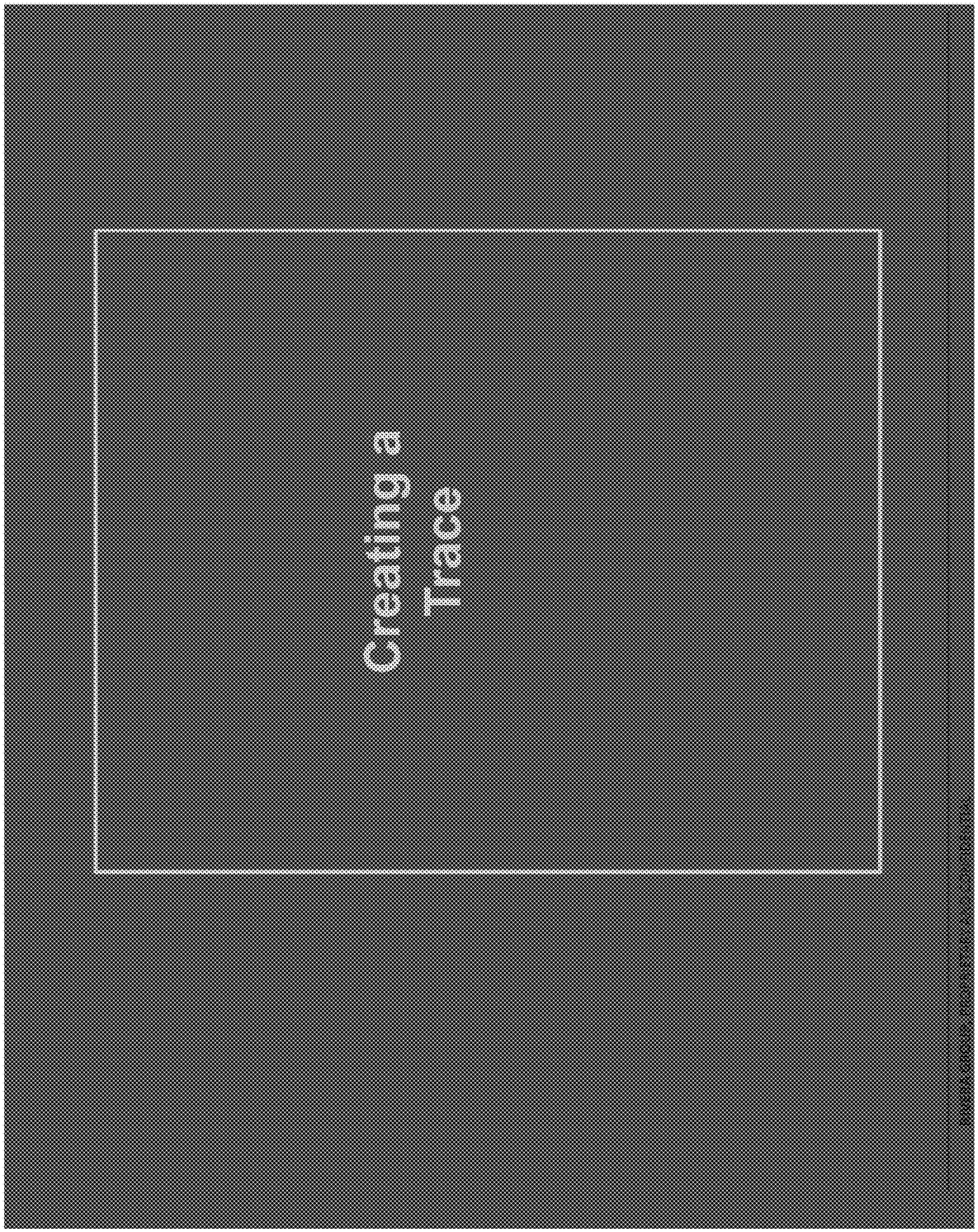

FIG. 7 shows a flowchart of an embodiment of a process for tracing source code to determine compliance or lack thereof with operational requirements therefor according to this disclosure. FIG. 8 to FIG. 42 show various screenshots with various explanation for a system enabled for tracing source code to determine compliance or lack thereof with operational requirements therefor according to this disclosure. FIG. 43 shows a flowchart of an embodiment for tracing source code according to this disclosure. FIG. 44 shows a screenshot of an embodiment of a graph depicting all possible routes in a source code of a codebase according to this disclosure. FIG. 45 shows a screenshot of an embodiment of a graph depicting a subset of the all possible routes shown in FIG. 44 according to this disclosure. FIG. 46 shows a screenshot of an editing window of a source editor accessed when a route from the subset of routes of FIG. 45 has been selected according to this disclosure. In particular, a method 700 may be a more particular version of the process 200 of FIGS. 2-6. The method includes a set of blocks 702-716, which may be performed by the architecture 100, as also disclosed in FIGS. 8-46.

In block 702, the computing instance 108 (e.g., the source control repository 112, the source code editor 114) ingests (e.g., access, download, read) the codebase 118 for the software system, application, or component, which may be requested by the first client 104 or the N client 106 communicating with the computing instance 108 over the network 102. The codebase 118 includes the source code 120 reciting the set of logical components (e.g., functions, subroutines, classes, variables, statements, procedures, events, classes) enabling the software system, application, or component (e.g., at runtime).

In block 704, the computing instance 108 (e.g., the source control repository 112, the source code editor 114) identifies the set of logical components in the source code 120 after the codebase 118 has been ingested. This identification may be based on the computing instance 108 parsing (e.g., tokenizing) the source code 120 into or by the set of logical components, which may be based on various text processing (e.g., regular expressions, natural language processing, keyword identification, semantic processing).

In block 706, the computing instance 108 (e.g., the source control repository 112, the source code editor 114) forms a set of identifiers corresponding to the set of logical components identified in the source code 120. This formation may include the computing instance 108 generating the set of identifiers by extracting (e.g., copying) a set of names from the set of logical components and naming the set of identifiers accordingly. For example, if the source code 120 recites a subroutine (or another logical component) named Number_Generator, then the computing instance 108 may identify the subroutine Number_Generator (its beginning and end) in the source code 120, identify its name (Number_Generator) in the source code 120, copy that name into its memory (e.g., managed by the OS 110), and assign that name to be an identifier (Number_Generator) for the subroutine (Number_Generator) in its memory. For example, FIGS. 10-11 show a listing of identifiers from the set of identifiers.

In block 708, the computing instance 108 (e.g., the requirements editor 116) generates (e.g., creates) a diagram (e.g., a block diagram, a flowchart) including a set of shapes (e.g., blocks, rectangles) and a set of connectors (e.g., arrows) directionally interconnecting the set of shapes to model or simulate how the software system, application, or component should execute at runtime. For example, see FIGS. 14-21, which include a series of screens (e.g., a wizard) enabling this functionality for the first client 104 or the N client 106 based on a series of user inputs therefor. As such, this generation of the diagram forms a set of operational requirements for the software system, application, or component. This generation may include the first client 104 or the N client 106 communicating with the computing instance 108 over the network 108 and controlling the requirements editor 116 to generate (e.g., draw) the diagram based on a user input received from the first client 104 or the N client 106.

In block 710, the computing instance 108 (e.g., the source control repository 112, the source code editor 114, the requirements editor 116) relates (e.g., in memory) the set of shapes to the set of logical components via the set of identifiers. This relation (e.g., one-by-one) may occur whether individual shapes from the set of shapes are selected (e.g., one-by-one) and then related (e.g., one-by-one) to individual logical components from set of logical components via individual identifiers from the set of identifiers or whether individual logical components from the set of logical components are selected (e.g., one-by-one) via individual identifiers from the set of identifiers and then related (e.g., one-by-one) to individual shapes from the set of shapes. For example, see FIGS. 23-46. This relation may occur via the first client 104 or the N client 106 communicating with the computing instance 108 over the network 102 and selecting (e.g., via a cursor selection) a respective shape from the set of shapes in the diagram or a respective identifier from the set of identifiers included in a listing of identifiers (e.g., a screen or a user interface simultaneously showing a list of identifiers to be browsed through and selected) and then corresponding (e.g., one-to-one) the respective shape, as selected, with the respective identifier, as selected, or vice versa, as shown in FIGS. 8-46. This selection may be based on a user input received from the first client 104 or the N client 106. Note that a respective logical component from the set of logical components may also be selected from within a respective segment of the source code 120 shown in the source code editor 114 reciting the respective logical component. Regardless, once such correspondence is made, the first client 104 or the N client 106 may confirm same by pressing a virtual button within a respective user interface, although this is not mandatory and a mere correspondence (e.g., a first cursor selection to select a respective shape or identifier and a second cursor selection to select a respective identifier or shape) between the respective shape, as selected, and the respective shape, as selected, may suffice. Note that such relation can occur for all shapes in the set of shapes and there may still be logical components remaining that are not related, as disclosed herein. The set of shapes is related with the set of logical components via the set of identifiers based on the user input such that a set of relational dependencies (e.g., inter-dependencies) within the set of logical components is modeled or simulated via the set of connectors among the set of shapes. For example, the set of relational dependencies (e.g., what logical component logically relates and logically depends from what logical component) between the set of logical components enables the user to understand (e.g., memorialize, model, simulate, write, output, display) how the set of logical components is interrelated at runtime. For example, the set of relational dependencies between the set of logical components can indicate which subroutine within the source code 120 depends on or calls which subroutine within the source code 120 during runtime.

In block 712, the computing instance 108 (e.g., the source control repository 112, the source code editor 114, the requirements editor 116) selects a logical component from the set of logical components. This may occur via the first client 104 or the N client 106 communicating with the computing instance 108 over the network 102 and operating the source control repository 112, the source code editor 114, or the requirements editor 116 based on a user input (e.g., a cursor selection) after the user input of block 710 and selecting (e.g., a cursor selection) a respective identifier from the set of identifiers corresponding to the logical component from the set of logical components. The selection may occur within the listing of identifiers (e.g., a screen or a user interface simultaneously showing a list of identifiers to be browsed through and selected). For example, see FIGS. 10-11. Note that the logical component may also be selected within a segment of the source code 120 reciting the logical component, and such selection being made within the source code editor 114. For example, the logical component may be selected from the set of logical components based on the user input via an identifier selected from the set of identifiers or the logical component may be selected from the set of logical components based on the user input via a selection of a respective segment of the source code 120. As shown in FIG. 10-11, the processor is further programmed to present a browser programmed to enable browsing through the set of identifiers and receive the third user input selecting the logical component from the set of logical components via the identifier from the set of identifiers presented in the browser.

In block 714, the computing instance 108 (e.g., the source control repository 112, the source code editor 114, the requirements editor 116) performs a trace through the source code 120 starting from the logical component, as selected in block 712, in the source code 120 through all possible routes in the source code 120 until the trace has reached an end point in the source code 120. For example, see FIGS. 12, 23. The trace may include a valid or complete trace and not an invalid or incomplete trace. The trace may include a single trace or the set of sub-traces traceably branching out throughout the source code 120. The set of sub-traces may be running serially. The set of sub-traces may be running in parallel. The sub-traces may be sourced from a set of computing threads of execution or processes executed or run by or within the source control repository 112, the source code editor 114, the requirements editor 116, or otherwise in the computing instance 108, which may accelerate how much time the trace takes to complete. The trace, which may include looping, iteration, or recursion among the set of logical components in the source code 120, may be run through the source code 120 from the starting point in the source code 120 through all possible routes in the source code 120 until the trace has reached the end point (e.g., an ultimate end point) in the source code 120 (e.g., based on logical conclusion thereof). This path of execution between the starting point and the end point may include the single trace or the set of sub-traces, as disclosed herein. The trace can run through or iterate until all possible routes in the source code 120 are identified and the trace has reached its end point (e.g., an ultimate end point) in the source code 120. The end point may be a single point in the source code 120 or multiple different points in the source 120. The trace may be iteratively performed based on (a) searching for a call within the source code 120 to another section of the source code 120 to identify a set of subsequent or temporal events, (b) assigning a sequence identifier for the call until there are no more subsequent or temporal events and all end points for any and all traces from the logical component have been identified, where the end point includes the all end points.

In block 716, the computing instance 108 (e.g., the source control repository 112, the source code editor 114, the requirements editor 116) may identify a subset of routes from the all possible routes that do not satisfy the diagram based on the set of relational dependencies via the set of shapes and the set of connectors after the end point has been reached in the source code 120, as shown in FIGS. 8-46. This identification may be performed in various ways.

For example, the computing instance 108 may (a) generate a temporal model (e.g., a graph, a tree) mapping the all possible routes for the software system, application, or component, (b) apply the diagram to the temporal model to identify a first subset of routes from the all possible routes that do satisfy the diagram based on the set of relational dependencies via the set of shapes and the set of connectors after the end point has been reached in the source code 120, and (c) identify all routes remaining other than the first subset of routes from the all possible routes that do satisfy the diagram based on the set of relational dependencies via the set of shapes and the set of connectors after the end point has been reached in the source code 120. These remaining routes may be classified as a second subset of routes from the all possible routes that do not satisfy the diagram based on the set of relational dependencies via the set of shapes and the set of connectors after the end point has been reached in the source code 120. For example, the subset of routes is a first subset of routes, where the first subset of routes is identified based on identifying a second subset of routes from the all possible routes that satisfy the diagram based on the set of relational dependencies via the set of shapes and the set of connectors after the end point has been reached in the source code and then classifying all remaining routes other than the second subset of routes from the all possible routes as the first subset of routes. Therefore, the second subset of routes may be identified as the subset of routes from the all possible routes that do not satisfy the diagram based on the set of relational dependencies via the set of shapes and the set of connectors after the end point has been reached in the source code 120.

For example, if the temporal model is a graph, as shown in FIGS. 8-46, then the graph includes a set of vertices (e.g., nodes) and a set of edges (e.g., arrows) connecting the set of vertices. The set of vertices may correspond to the set of logical components based on or after the trace being completed and the set of edges may inter-relationally, logically, or directionally model the set of logical components in terms of path of execution at runtime based on or after the trace is completed (e.g., how program execution flows among the set of logical components). As shown in FIG. 4, the temporal model may include the set of vertices corresponding to all logical components identified in T1 (A, B, C, D, E) and T2 (A, F, C, D, E) and the set of edges may inter-relationally, logically, or directionally model which respective logical component (A, B, C, D, E, F) calls which respective logical component (A, B, C, D, E, F), as disclosed herein.

For example, as shown in FIGS. 8-46, within the computing instance 108 (e.g., the requirements editor 116), the set of operational requirements may be represented or depicted as a block diagram having a set of blocks (e.g., rectangles) and a set of connectors (e.g., arrows) directionally interconnecting the set of blocks, where the set of blocks models the set of logical components and the set of connectors models how the set of logical components is logically executed (e.g., which logical component calls which logical component). As such, the computing instance 108 may access the block diagram depicting the set of operation requirements and attempt to match (e.g., by respective identifiers) at least some blocks from the set of the blocks to at least some vertices from the set of vertices in the temporal model of the all possible traces, while also attempting to match at least some connectors, including directionality, from the set of connectors to at least some edges from the set of edges in the temporal model of the all possible software traces. Therefore, whatever blocks in the set of blocks match respective vertices in the set of vertices (e.g., by identifiers) and whatever connectors in the set of connectors match respective edges in the set of edges (e.g., by identifiers and directionality) enables the computing instance 108 to identify all routes from the all possible routes that that do satisfy the diagram based on the set of relational dependencies via the set of shapes and the set of connectors after the end point has been reached in the source code 120, which corresponds to all software traces that satisfy the assertion of the software specification, i.e., compliance with the set of operational requirements. For example, as shown in FIG. 5, based on the temporal model of the all possible software traces, the computing instance 108 determines that a trace T1 (A, B, C, D, E) satisfies the assertion of the software specification. As such, whatever routes are remaining in the temporal model of the all possible traces would identify all routes that do not satisfy the diagram based on the set of relational dependencies via the set of shapes and the set of connectors after the end point has been reached in the source code 120, which corresponds to all routes that do not satisfy the assertion of the software specification, i.e., lack of compliance with the set of operational requirements.

The codebase 108 may be ingested such that an abstract version of the source code 120 is formed. As such, the set of logical components may be identified based on the abstract version, as per block 704. Likewise, the set of identifiers may be formed based on the abstract version, as per block 706. Similarly, the set of shapes may be related to the set of logical components via the set of identifiers based on the abstract version, as per block 710. Further, the subset of routes may be identified based on the abstract version, as per block 716.

In block 718, as shown in FIGS. 8-46, the computing instance 718 takes an action based on the subset of routes from the all possible routes that do not satisfy the diagram based on the set of relational dependencies via the set of shapes and the set of connectors after the end point has been reached in the source code 120. There may be various actions that may be taken by the computing instance 108. For example, the subset of routes from the all possible routes that do not satisfy the diagram may be visualized simultaneously with all remaining routes that so satisfy the diagram such that the all possible routes that do not satisfy the diagram are visually distinct (e.g., vertice color, vertice background color, color of content within vertice, edge color) from the all remaining routes that so satisfy the diagram, i.e., whatever software traces that satisfy the assertion of the software specification and whatever software traces that do not satisfy the assertion of the software specification may be distinctly output (e.g., displayed) for the user to readily distinguish (e.g., based on color). For example, as shown in FIG. 6, based on the temporal model of the all possible software traces, the computing instance 108 determines that a trace T2 (A, F, C, D, E) is remaining as not satisfying the assertion of the software specification and therefore is visually distinguishable from the Trace T1 accordingly. Likewise, such form of visual distinction is also shown in FIGS. 23-46.

For example, the subset of routes from the all possible routes that do not satisfy the diagram based on the set of relational dependencies via the set of shapes and the set of connectors after the end point has been reached in the source code 120 may correspond to a first subset of routes. As such, the action may include identifying a second subset of routes from the all possible routes that do satisfy the diagram based on the set of relational dependencies via the set of shapes and the set of connectors after the end point has been reached, where the first subset of routes and the second subset of routes total the all possible routes. The first subset of routes is visually or tactfully distinct from the second subset of routes when the first subset of routes and the second subset of routes is simultaneously visualized or tactile. The action may include monitoring the source code 120 for an anomaly (e.g., based on a set of rules, a heuristic, a requirements diagram, a baseline template). This anomaly may be the source code 120 being changed (e.g., by the first client 104 or the N client 106 operating the source code editor 114) such that an intra-association between the second subset of routes could be compromised (e.g., by comparing against the second subset of routes as generated). The anomaly may be a change (e.g., by the first client 104 or the N client 106 operating the requirements editor 116) in the set of shapes (e.g., removing a shape, connecting a shape to another shape with a new connector, unrelating a shape from its logical component, relating a new logical component to a shape) or in the set of connectors (e.g., changing directionality of a connector, removal of a connector) that could affect the second subset of routes (e.g., by comparing against the second subset of routes as generated). The anomaly may be a dependency associated with either the source code 120, or the set of shapes or the set of connectors being added, modified, or removed (e.g., by comparing by comparing against the second subset of routes as generated). Note that the action may include monitoring the source code 120 periodically to identify an assertion violation based on a change to the source code 120 that does not satisfy the diagram based on the set of shapes and the set of connectors. The action may include issuing a notification (e.g., displaying a notice on the first client 104 or the N client 106) to the user such that the user is able act (e.g., via the first client 104 or the N client 106) based on the anomaly.

For example, as shown in FIGS. 8-46, the action may include generating a graph including a set of vertices and a set of edges, where the set of vertices corresponds to the set of logical components via the set of identifiers, and where the set of edges corresponds to how the set of logical components is interconnected modeling the set of relational dependencies. The graph temporally models the all possible routes and the subset of routes is visually distinct from another subset of routes that do satisfy the diagram based on the set of relational dependencies via the set of shapes and the set of connectors when the graph is visualized or tactile, where the subset of routes and the another subset of routes total the all possible routes. As shown in FIG. 23-28, 33, 42, 44, 45 the subset of routes is visually distinct based on color from the another subset of routes that do satisfy the diagram based on the set of relational dependencies via the set of shapes and the set of connectors when the graph is visualized. As shown in FIG. 23-28, 33, 42, each vertice in the set of vertices is user-selectable to present a menu over the graph corresponding to that respective identifier from the set of identifiers. The menu includes a user input element programmed to activate a presentation of a view of a segment of the source code in corresponding to that respective identifier from the set of identifiers within a source code editor programmed to access the codebase.

As shown in FIG. 23-28, 33, 42, 44, 45, each vertice in the set of vertices may be user-selectable to present a menu lateral to the graph corresponding to that respective identifier from the set of identifiers. Each vertice in the set of vertices that is not user-selected and not upstream or not downstream to that respective vertice is visually distinct relative to each vertice in the set of vertices that is user-selected and upstream or downstream to that respective vertice. Each vertice in the set of vertices that is not user-selected and not upstream or not downstream to that respective vertice is visually distinct relative to each vertice in the set of vertices that is user-selected and upstream or downstream to that respective vertice based on color intensity.

Multiple diagrams may be used, as shown in FIGS. 8-46. For example, the diagram may be a first diagram, where the set of shapes is a first set of shapes, where the set of connectors is a first set of connectors, and where the set of relational dependencies is a first set of relational dependencies. As such, the computing instance 108 may be further programmed to generate a second diagram based on a user input from the first client 104 or the N client 106. The second diagram includes a second set of shapes and a second set of connectors, where the second set of connectors directionally interconnects the second set of shapes. Then, the computing instance 108 may relate the second set of shapes to the set of logical components via the set of identifiers based on a user input from the first client 104 or the N client 106. This relation may be similar block 710 such that a second set of relational dependencies between the logical components is modeled via the second set of connectors. As such, the computing instance 108 may identify the subset of routes from the all possible routes that do not satisfy (a) the first diagram based on the first set of relational dependencies via the first set of shapes and the first set of connectors after the end point has been reached in the source code 120 and (b) the second diagram based on the second set of relational dependencies via the second set of shapes and the second set of connectors after the end point has been reached in the source code 120.

As shown in FIGS. 8-46, the set of related files 122 may include at least one of a network log for the software system, application, or component, a business process document for the software system, application, or component, an application log for the software system, application, or component, or a database log for the software system, application, or component. As such, the computing instance 108 may ingest at least one of the network log for the software system, application, or component, the business process document for the software system, application, or component, the application log for the software system, application, or component, or the database log for the software system, application, or component. Then, the computing instance 108 may identify the set of logical components in at least one of the network log, the business process document, the application log, or the database log (e.g., based on parsing thereof) and form the set of identifiers corresponding to the set of logical components in the source code and at least one of the network log, the business process document, the application log, or the database log.

FIG. 43 shows a flowchart of an embodiment for tracing source code according to this disclosure. In particular, as disclosed herein, the computing instance 108 is programmed to identify all possible traces when performing analysis, maintenance, or modification to a legacy or modern codebase 118. Therefore, having access to visualization of code traces, leveraging temporal logic, and on-screen code documentation minimizes risk to a respective computing environment. As such, the computing instance 108 creating temporal traces through the source code 120 from a predetermined starting point, through all possible routes until the end point has been reached. This may occur by reading in a file for a software event selected by the user. The computing instance 108 analyzes the source code 120, looking for any calls to other sections of the source code 120 within the file, other files, or external connections. Once subsequent, or temporal, event is identified, the computing instance 108 assign a sequence identifier (e.g., id) and performs that same processing on all temporal events identified in this phase looking for a next temporal event. The computing instance 108 will perform this process until there are no more temporal events and all end points for any and all traces from an original event that has have been identified.

FIG. 44 shows a screenshot of an embodiment of a graph depicting all possible routes in a source code of a codebase according to this disclosure. FIG. 45 shows a screenshot of an embodiment of a graph depicting a subset of the all possible routes shown in FIG. 44 according to this disclosure. In particular, as disclosed herein, the computing instance 108 a provides visual representation (e.g., a graph) of these traces for easy identification of the code trace, allowing the user to select a trace that is desired. This selection isolates the temporal events to that selected trace. Note that such selection may also allow for visual distinction, as disclosed herein.

FIG. 46 shows a screenshot of an editing window of a source editor accessed when a route from the subset of routes of FIG. 45 has been selected according to this disclosure. If desired, then the user can elect a temporal event within the visual representation and chose to see the source code 120 that supports that respective event within the source code editor 114. This choosing may reduce time for combing through uncorrelated documentation or performing analysis of the source code 120 to determine any and all traces.

In addition, features described with respect to certain example embodiments may be combined in or with various other example embodiments in any permutational or combinatory manner. Different aspects or elements of example embodiments, as disclosed herein, may be combined in a similar manner. The term "combination", "combinatory," or "combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to be-come coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer soft-ware, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required be-fore, after, and/or concurrently with example embodiments, as disclosed herein. Note that any and/or all methods and/or processes, at least as disclosed herein, can be at least partially performed via at least one entity or actor in any manner.

Although preferred embodiments have been depicted and described in detail herein, skilled artisans know that various modifications, additions, substitutions and the like can be made without departing from spirit of this disclosure. As such, these are considered to be within the scope of the disclosure, as defined in the following claims.

What is claimed is:

1. A system, comprising:
a processor programmed to:
access a codebase for a software system, an application, or a component, wherein the codebase includes a source code reciting a set of logical components enabling the software system, the application, or the component;
identify the set of logical components in the source code after the codebase has been accessed;
form a set of identifiers corresponding to the set of logical components identified in the source code;
receive a first user input;
generate a diagram based on the first user input, wherein the diagram includes a set of shapes and a set of connectors, and wherein the set of connectors directionally interconnects the set of shapes;
receive a second user input;
relate the set of shapes to the set of logical components via the set of identifiers based on the second user input such that a set of relation al dependencies within the set of logical components is modeled via the set of connectors among the set of shapes;
enable a user interface to be presented, wherein the user interface is programmed to enable browsing through the set of identifiers and to receive a third user input selecting a logical component from the set of logical components via an identifier selected from the set of identifiers presented in the user interface;
perform a trace through the source code starting from the logical component selected from the set of logical components in the source code through all possible routes in the source code until the trace has reached an end point in the source code;
identify a subset of routes from the all possible routes that do not satisfy the diagram based on the set of relational dependencies via the set of shapes and the set of connectors after the end point has been reached in the source code; and
perform an action based on the subset of routes.

2. The system of claim 1, wherein the subset of routes is a first subset of routes, wherein the action includes identifying a second subset of routes from the all possible routes that do satisfy the diagram based on the set of relational dependencies via the set of shapes and the set of connectors after the end point has been reached in the source code, and wherein the first subset of routes and the second subset of routes total the all possible routes.

3. The system of claim 2, wherein the first subset of routes is visually or tactfully distinct from the second subset of routes when the first subset of routes and the second subset of routes is simultaneously visualized or tactile.

4. The system of claim 2, wherein the action includes monitoring the source code for an anomaly including at least one of (a) the source code being changed such that an intra-association between the second subset of routes could be compromised, (b) a change in the set of shapes or in the set of connectors that could affect the second subset of routes, or (c) a dependency associated with either the source code or the set of shapes or the set of connectors being added, modified, or removed.

5. The system of claim 4, wherein the action includes issuing a notification to a user such that the user is able to act based on the anomaly.

6. The system of claim 4, wherein the anomaly is the source code being changed such that an intra-association between the second subset of routes could be compromised.

7. The system of claim 4, wherein the anomaly is the change in the set of shapes or in the set of connectors that could affect the second subset of routes.

8. The system of claim 4, wherein the anomaly is the dependency associated with either the source code or the set of shapes or the set of connectors being added, modified, or removed.

9. The system of claim 1, wherein the action includes generating a graph including a set of vertices and a set of edges, wherein the set of vertices corresponds to the set of logical components via the set of identifiers, wherein the set of edges corresponds to how the set of logical components is interconnected modeling the set of relational dependencies such that the graph temporally models the all possible routes and the subset of routes is visually distinct from another subset of routes that do satisfy the diagram based on the set of relational dependencies via the set of shapes and the set of connectors when the graph is visualized or tactile, and wherein the subset of routes and the another subset of routes total the all possible routes.

10. The system of claim 9, wherein the subset of routes is visually distinct based on color from the another subset of routes that do satisfy the diagram based on the set of relational dependencies via the set of shapes and the set of connectors when the graph is visualized.

11. The system of claim 9, wherein each vertex in the set of vertices is user-selectable to present a menu lateral to the graph corresponding to that respective identifier from the set of identifiers.

12. The system of claim 11, wherein each vertex in the set of vertices that is not user-selected and not upstream or not downstream to that respective vertex is visually distinct relative to each vertex in the set of vertices that is user-selected and upstream or downstream to that respective vertex.

13. The system of claim 12, wherein each vertex in the set of vertices that is not user-selected and not upstream or not downstream to that respective vertex is visually distinct relative to each vertex in the set of vertices that is user-selected and upstream or downstream to that respective vertex based on color intensity.

14. The system of claim 9, wherein each vertex in the set of vertices is user-selectable to present a menu over the graph corresponding to that respective identifier from the set of identifiers.

15. The system of claim 14, wherein the menu includes a user input element programmed to activate a presentation of a view of a segment of the source code in corresponding to that respective identifier from the set of identifiers within a source code editor programmed to access the codebase.

16. The system of claim 1, wherein the action includes monitoring the source code to identify an assertion violation based on a change to the source code that does not satisfy the diagram based on the set of shapes and the set of connectors.

17. The system of claim 1, wherein the trace is iteratively performed based on (a) searching for a call within the source code to another section of the source code to identify a set of subsequent or temporal events and (b) assigning a sequence identifier for the call until there are no more subsequent or temporal events and all end points for any and all traces from the logical component selected from the set of logical components have been identified, and wherein the end point includes the all end points.

18. The system of claim 1, wherein the codebase is accessed such that an abstract version of the source code is formed, wherein the set of logical components is identified based on the abstract version of the source code, wherein the set of identifiers is formed based on the abstract version of the source code, wherein the set of shapes is related to the set of logical components via the set of identifiers based on the abstract version of the source code, and wherein the subset of routes is identified based on the abstract version of the source code.

19. The system of claim 1, wherein the diagram is a first diagram,
wherein the set of shapes is a first set of shapes, wherein the set of connectors is a first set of connectors, wherein the set of relational dependencies is a first set of relational dependencies, and wherein the processor is further programmed to:
receive a fourth user input;
generate a second diagram based on the fourth user input, wherein the second diagram includes a second set of shapes and a second set of connectors, and wherein the second set of connectors directionally interconnects the second set of shapes;
receive a fifth user input after the fourth user input; and
relate the second set of shapes to the set of logical components via the set of identifiers based on the fifth user input such that a second set of relational dependencies between the set of logical components is modeled via the second set of connectors, wherein the subset of routes is identified from the all possible routes that do not satisfy (a) the first diagram based on the first set of relational dependencies via the first set of shapes and the first set of connectors after the end point has been reached in the source code and (b) the second diagram based on the second set of relational dependencies via the second set of shapes and the second set of connectors after the end point has been reached in the source code.

20. The system of claim 1, wherein the processor is further programmed to:
access at least one of a network log for the software system, the application, or the component, a business process document for the software system, the application, or the component, an application log for the software system, the application, or the component, or a database log for the software system, the application, or the component;
identify the set of logical components in at least one of the network log, the business process document, the application log, or the database log; and
form the set of identifiers corresponding to the set of logical components in the source code and at least one of the network log, the business process document, the application log, or the database log.

21. The system of claim 1, wherein the logical component is selected from the set of logical components based on the third user input via the identifier being selected from the set of identifiers listed within a listing of identifiers.

22. The system of claim 1, wherein the logical component is selected from the set of logical components based on the third user input via a selection of a respective segment of the source code.

23. The system of claim 1, wherein the subset of routes is a first subset of routes, and wherein the first subset of routes is identified based on identifying a second subset of routes from the all possible routes that satisfy the diagram based on the set of relational dependencies via the set of shapes and the set of connectors after the end point has been reached in the source code and then classifying all remaining routes other than the second subset of routes from the all possible routes as the first subset of routes.

* * * * *